(12) United States Patent
Salem

(10) Patent No.: US 11,490,382 B2
(45) Date of Patent: Nov. 1, 2022

(54) PHYSICAL UPLINK SHARED CHANNEL ENHANCEMENTS FOR TRANSMISSION WITH CONFIGURED GRANT IN UNLICENSED SPECTRUM

(71) Applicant: Huawei Technologies Co., Ltd., Shenzhen (CN)

(72) Inventor: Mohamed Adel Salem, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 27 days.

(21) Appl. No.: 16/905,497

(22) Filed: Jun. 18, 2020

(65) Prior Publication Data

US 2020/0404655 A1 Dec. 24, 2020

Related U.S. Application Data

(60) Provisional application No. 62/865,137, filed on Jun. 21, 2019.

(51) Int. Cl.
*H04W 4/00* (2018.01)
*H04W 72/04* (2009.01)
(Continued)

(52) U.S. Cl.
CPC ....... *H04W 72/0446* (2013.01); *H04W 16/14* (2013.01); *H04W 72/042* (2013.01); *H04W 72/14* (2013.01)

(58) Field of Classification Search
None
See application file for complete search history.

(56) References Cited

U.S. PATENT DOCUMENTS 10,362,593 B2  7/2019 Salem et al.
2016/0309498 A1  10/2016 Luo et al.
(Continued)

FOREIGN PATENT DOCUMENTS

CN   108668368 A   10/2018
WO   WO 2020/063408 A1   4/2020

OTHER PUBLICATIONS

Intel Corporation, Enhancements to configured grants for NR-unlicensed, 3GPP TSG RAN WG1 Meeting #97, Reno, Nevada, USA, May 13-17, 2019, R1-1906788, 11 pages.
(Continued)

*Primary Examiner* — Clemence S Han
(74) *Attorney, Agent, or Firm* — Slater Matsil, LLP

(57) ABSTRACT

Aspects of the present application provide for flexibility in configuring channel access occasions for uplink transmissions within a configured grant transmission resource duration. The uplink transmission may be transmitted in the physical uplink shared channel (PUSCH). The configured grant transmission resource duration includes multiple orthogonal frequency division multiplexed (OFDM) symbols. In some implementations, resources for uplink transmissions are allocated such that an integer number of equally sized mini-slots, each of which is considered a separate PUSCH, fit within the slot. This occurs when the number of OFDM symbols within the slot is evenly divisible by the number of OFDM symbols in the mini-slot. In some embodiments, not all of the mini-slots in the slot are equal in size. This occurs when the number of OFDM symbols within the slot is not evenly divisible by a particular mini-slot size.

29 Claims, 15 Drawing Sheets

(51) Int. Cl.
*H04W 72/14* (2009.01)
*H04W 16/14* (2009.01)

(56) References Cited

U.S. PATENT DOCUMENTS

| | | | |
|---|---|---|---|
| 2017/0289869 | A1 | 10/2017 | Nogami et al. |
| 2019/0075581 | A1 | 3/2019 | Salem et al. |
| 2019/0394759 | A1* | 12/2019 | Ying .................... H04L 5/0092 |
| 2020/0275431 | A1* | 8/2020 | Bae .......................... H04L 5/00 |
| 2020/0314889 | A1* | 10/2020 | Cirik ..................... H04L 5/0098 |
| 2020/0359409 | A1* | 11/2020 | Karaki .............. H04W 72/0446 |
| 2021/0014005 | A1* | 1/2021 | Ying ........................ H04L 1/08 |
| 2021/0219271 | A1* | 7/2021 | Takeda .................. H04L 1/1887 |
| 2021/0314982 | A1* | 10/2021 | Panteleev ............. H04W 72/14 |

OTHER PUBLICATIONS

NTT Docomo, Inc., UL data transmission procedure, 3GPP TSG RAN WG1 Meeting #92bis, Sanya, China, Apr. 16-20, 2018, R1-1805057, 5 pages.

"3rd Generation Partnership Project; Technical Specification Group Radio Access Network; Physical layer procedures for shared spectrum channel access" (Release 15), 3GPP TS 37.213 V15.2.0, Mar. 2019, 20 pages.

"3rd Generation Partnership Project; Technical Specification Group Radio Access Network; NR; Physical layer procedures for data" (Release 15), 3GPP TS 38.214 V15.5.0, Mar. 2019, 103 pages.

3GPP TS 37.213; 3rd Generation Partnership Project; Technical Specification Group Radio Access Network; "Physical layer procedures for shared spectrum channel access"; (Release 15), V15.0.0, Jun. 2018, 20 pages.

Huawei; 3GPP TSG RAN WG1 Meeting #97, "Transmission with configured grant in NR unlicensed band", Reno, USA, May 13-17, 2019, 22 pages.

Vivo; 3GPP TSG RAN WG1 #97, "Discussion on the enhancements to configured grants", Reno, USA, May 13-17, 2019, 10 pages.

Huawei, et al., "Transmission with configured grant in NR unlicensed band", 3GPP TSG RAN WG1 Meeting #97, R1-1906047, May 13-17, 2019, 22 Pages, Reno, USA.

Huawei, et al., "Enhanced UL configured grant transmissions", 3GPP TSG RAN WG1 Meeting #96, R1-1901562, Feb. 25-Mar. 1, 2019, 16 Pages, Athens, Greece.

Panasonic, "Configured grant enhancements for Nr-U", 3GPP Tsg Ran WG1 #97, R1-1906869, May 13 - 17, 2019, 5 Pages, Reno, USA.

* cited by examiner

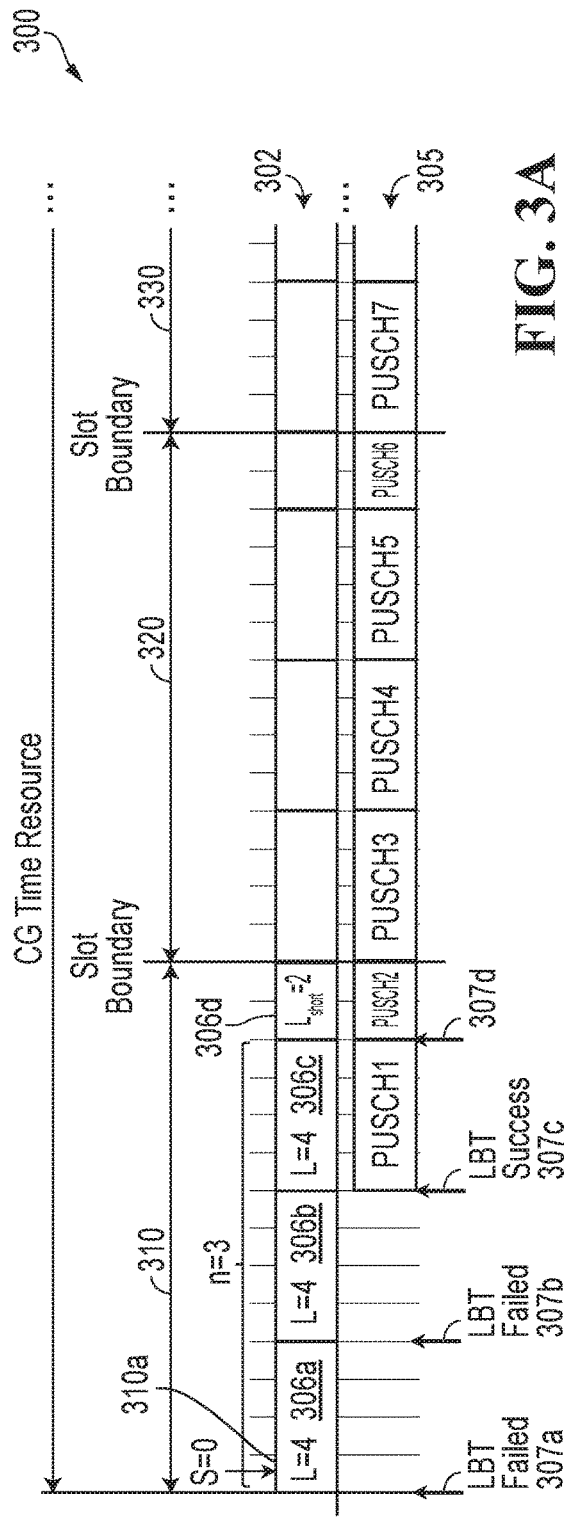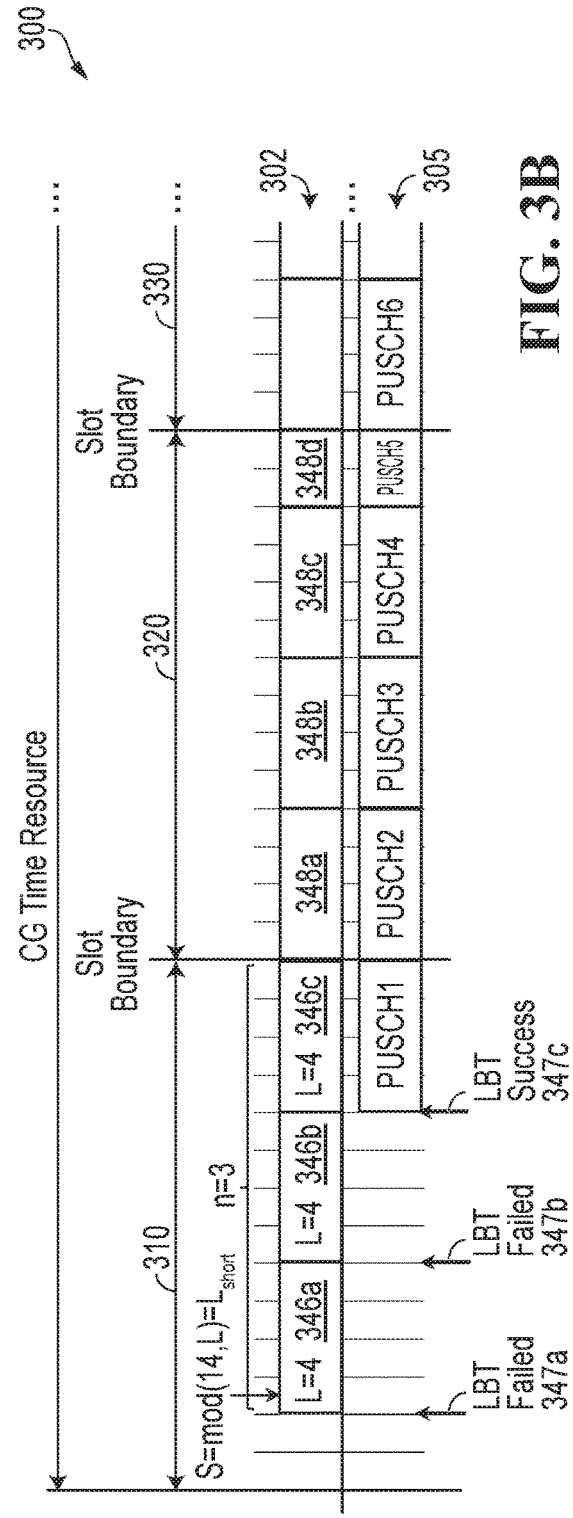

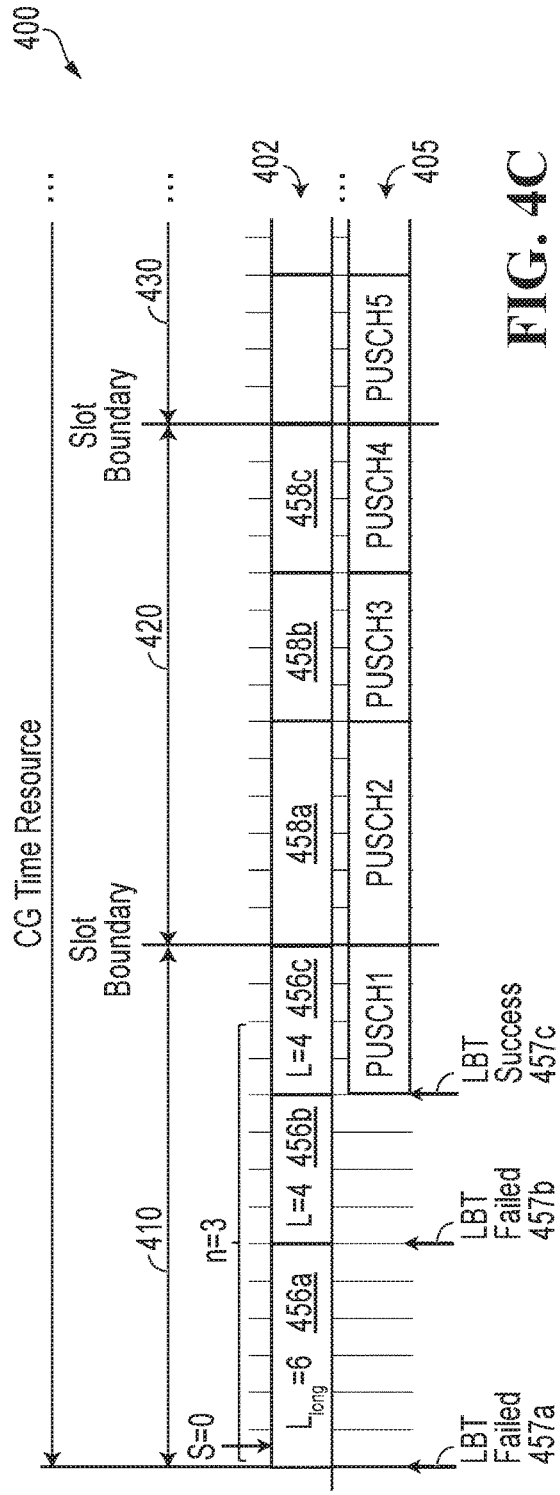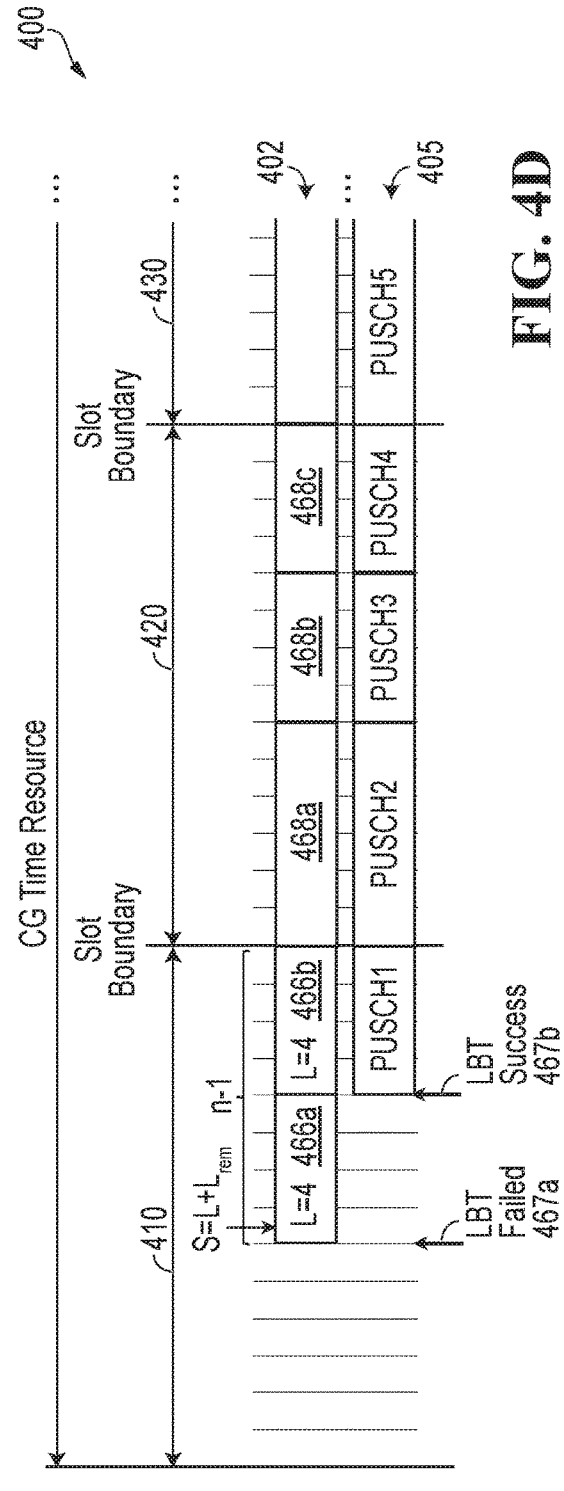

PHYSICAL UPLINK SHARED CHANNEL ENHANCEMENTS FOR TRANSMISSION WITH CONFIGURED GRANT IN UNLICENSED SPECTRUM

RELATED APPLICATIONS

This application claims the benefit of priority of U.S. Provisional Patent Application 62/865,137 filed on Jun. 21, 2019, which is hereby incorporated by reference in its entirety.

FIELD

The present disclosure relates generally to wireless communications, and in particular embodiments, to configured grant (CG) uplink transmissions in unlicensed spectrum.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and during a particular time slot. The frequency and time slot used is an example of a physical communication resource.

In an LTE grant-based transmission, the required transmission control parameters are typically communicated via a Physical Uplink Control Channel (PUCCH) and Physical Downlink Control Channel (PDCCH). Information payload transmitted by the ED may then be sent on the physical uplink shared channel (PUSCH). The base station is aware of the identity of the ED sending the uplink transmission using the granted uplink resources, because the base station specifically granted those uplink resources to that ED. In a configured grant transmission, different EDs may send uplink transmissions using uplink resources shared by the EDs, without specifically requesting use of the resources and without specifically being dynamically granted the resources by the base station. One advantage of configured grant transmission is low latency resulting from not having to request and receive a dynamic grant for an allocated time or frequency resource from the base station. Furthermore, in a configured grant transmission, the scheduling overhead may be reduced. However, the base station does not have information which ED, if any, is sending a configured grant uplink transmission at a particular moment of time, which may require blind detection of configured grant transmissions received at the base station. In other words, the base station is required to determine which ED is transmitting. Therefore, the BS can use the combination of uplink reference symbols (RS) and occupied time-frequency resources to identify a configured grant ED as well as the transport block being received from that configured grant ED.

Some modes of communication may enable communications with an ED over an unlicensed spectrum band, or over different spectrum bands (e.g., an unlicensed spectrum band and/or a licensed spectrum band) of a wireless network. Given the scarcity and expense of bandwidth in the licensed spectrum, exploiting the vast and free-of-charge unlicensed spectrum to offload at least some communication traffic is an approach that has garnered interest from mobile broadband (MBB) network operators. For example, in some cases uplink transmissions may be transmitted over an unlicensed spectrum band. Accordingly, efficient and fair mechanisms for configured grant uplink transmissions in the unlicensed spectrum may be desirable.

SUMMARY

In a first aspect of the present application, there is provided a method for a user equipment (UE) using configured grant (CG) for uplink transmission in unlicensed spectrum, the method involves receiving, at the UE from a network device, CG resource configuration information including time domain resource configuration information to configure the UE for a number of CG consecutive physical uplink shared channel (PUSCH) allocations within a slot of a CG time resource, the time domain resource configuration information comprising an indication of a start symbol and a fixed length of a first PUSCH allocation within a slot of the CG time resource, wherein the time domain resource configuration information defines multiple access occasions for the UE to start a CG uplink transmission within the CG time resource, each access occasion starting at a starting symbol of a corresponding PUSCH of the number of CG consecutive PUSCH allocations. The method further involves starting the CG uplink transmission at a first access occasion before which a listen-before-talk (LBT) channel access procedure is successful and transmitting consecutive CG PUSCHs in the remaining access occasions in accordance with the CG consecutive PUSCH allocations.

In some embodiments, the UE is configured with a number of repetitions, K, is greater than 1 and the UE repeats a transmission block (TB) in K earliest consecutive transmission occasion candidates within a same configuration.

In some embodiments, the number of CG consecutive PUSCH allocations within a slot, the first PUSCH allocation follows a configured Start and Length Indicator Value (SLIV) parameter, and remaining PUSCH allocations have a same length and PUSCH mapping type, and are appended following previous allocations without any gaps.

In some embodiments, a same combination of start symbol and length and PUSCH mapping type repeats over consecutively allocated slots.

In some embodiments, the method further involves configuring a plurality of PUSCH allocations in the CG time resource based upon the fixed length of the first PUSCH allocation and a number of a plurality of orthogonal frequency division multiplexed (OFDM) symbols available for CG uplink transmission in a first slot of the CG time resource.

In some embodiments, configuring the plurality of PUSCH allocations includes at least one of: configuring at least one PUSCH allocation that is equal to the fixed length of the first PUSCH allocation; configuring at least one PUSCH allocation that is equal to the fixed length of the first PUSCH allocation and a PUSCH allocation that is less than the fixed length of the first PUSCH allocation; and configuring at least one PUSCH allocation that is equal to the fixed length of the first PUSCH allocation and a PUSCH allocation that is greater than the fixed length of the first PUSCH allocation.

In some embodiments, the receiving, at the UE from the network device, the CG resource configuration information involves receiving the CG resource configuration in: a radio resource control (RRC) message; or a combination of a RRC message and downlink control information (DCI).

In a second aspect of the present application, there is provided an apparatus including a processor and a computer-readable medium. The computer-readable medium has stored thereon, computer executable instructions, that when executed by the processor, cause the apparatus to: receive, from a network device, CG resource configuration information including time domain resource configuration information to configure the UE for a number of CG consecutive PUSCH allocations within a slot of a CG time resource, the time domain resource configuration information comprising an indication of a start symbol and a fixed length of a first PUSCH allocation within a slot of the CG time resource; and wherein the time domain resource configuration information defines multiple access occasions for the UE to start a CG uplink transmission within the CG time resource, each access occasion starting at a starting symbol of a corresponding PUSCH of the number of CG consecutive PUSCH allocations; start the CG uplink transmission at a first access occasion before which a LBT channel access procedure is successful; and transmit consecutive CG PUSCHs in the remaining access occasions in accordance with the CG consecutive PUSCH allocations.

In some embodiments, the apparatus is configured with a number of repetitions, K, is greater than 1 and the UE repeats a TB in K earliest consecutive transmission occasion candidates within a same configuration.

In some embodiments, for the number of CG consecutive PUSCH allocations within a slot, the first PUSCH allocation follows a configured SLIV parameter, and remaining PUSCH allocations have a same length and PUSCH mapping type, and are appended following previous allocations without any gaps.

In some embodiments, a same combination of start symbol and length and PUSCH mapping type repeats over consecutively allocated slots.

In some embodiments, the apparatus further includes configuring a plurality of PUSCH allocations in the CG time resource based upon the fixed length of the first PUSCH allocation and a number of a plurality of OFDM symbols available for CG uplink transmission in a first slot of the CG time resource.

In some embodiments, configuring the plurality of PUSCH allocations includes at least one of: configuring at least one PUSCH allocation that is equal to the fixed length of the first PUSCH allocation; configuring at least one PUSCH allocation that is equal to the fixed length of the first PUSCH allocation and a PUSCH allocation that is less than the fixed length of the first PUSCH allocation; and configuring at least one PUSCH allocation that is equal to the fixed length of the first PUSCH allocation and a PUSCH allocation that is greater than the fixed length of the first PUSCH allocation.

In some embodiments, the receiving the CG resource configuration information includes receiving the CG resource configuration in: a RRC message; or a combination of a RRC message and DCI.

In a third aspect of the present application, there is provided a method for use in a network device involving transmitting, by the network device to a UE, CG resource configuration information including time domain resource configuration information to configure the UE for a number of CG consecutive PUSCH allocations within a slot of a CG time resource, the time domain resource configuration information comprising an indication of a start symbol and a fixed length of a first PUSCH allocation within a slot of the CG time resource; and wherein the time domain resource configuration information defines multiple access occasions for the UE to start a CG uplink transmission within the CG time resource, each access occasion starting at a starting symbol of a corresponding PUSCH of the number of CG consecutive PUSCH allocations. The method further includes receiving the CG uplink transmission at a first access occasion before which a LBT channel access procedure is successful and receiving consecutive CG PUSCHs in the remaining access occasions in accordance with the CG consecutive PUSCH allocations.

In some embodiments, the CG resource configuration information for configuring the UE includes a number of repetitions, K, that is greater than 1 causing the UE to repeat a TB in K earliest consecutive transmission occasion candidates within a same configuration.

In some embodiments, for the number of CG consecutive PUSCH allocations within a slot, the first PUSCH allocation follows a configured SLIV parameter, and remaining PUSCH allocations have a same length and PUSCH mapping type, and are appended following previous allocations without any gaps.

In some embodiments, a same combination of start symbol and length and PUSCH mapping type repeats over consecutively allocated slots.

In some embodiments, the CG resource configuration information for configuring the UE comprises information to configure a plurality of PUSCH allocations in the CG time resource based upon the fixed length of the first PUSCH allocation and a number of a plurality of OFDM symbols available for CG uplink transmission in a first slot of the CG time resource.

In some embodiments, the CG resource configuration information for configuring the UE includes information to configure the plurality of PUSCH allocations by: configuring at least one PUSCH allocation that is equal to the fixed length of the first PUSCH allocation; configuring at least one PUSCH allocation that is equal to the fixed length of the first PUSCH allocation and a PUSCH allocation that is less than the fixed length of the first PUSCH allocation; and configuring at least one PUSCH allocation that is equal to the fixed length of the first PUSCH allocation and a PUSCH allocation that is greater than the fixed length of the first PUSCH allocation.

In some embodiments, the transmitting, at the network device to the UE, the CG resource configuration information includes transmitting the CG resource configuration in: a RRC message; or a combination of a RRC message and DCI.

In a fourth aspect of the present application, there is provided an apparatus including a processor and a computer-readable medium. The computer-readable medium has stored thereon, computer executable instructions, that when executed by the processor, cause the apparatus to transmit, by the network device to a UE, CG resource configuration information including time domain resource configuration information to configure the UE for a number of CG consecutive PUSCH allocations within a slot of a CG time resource, the time domain resource configuration information comprising an indication of a start symbol and a fixed length of a first PUSCH allocation within a slot of the CG time resource; and wherein the time domain resource configuration information defines multiple access occasions for the UE to start a CG uplink transmission within the CG time resource, each access occasion starting at a starting symbol of a corresponding PUSCH of the number of CG consecutive PUSCH allocations; receive the CG uplink transmission at a first access occasion before which a LBT channel access procedure is successful; and receive consecutive CG PUSCHs in the remaining access occasions in accordance with the CG consecutive PUSCH allocations.

In some embodiments, the CG resource configuration information for configuring the UE includes a number of repetitions, K, that is greater than 1 causing the UE to repeat a TB in K earliest consecutive transmission occasion candidates within a same configuration.

In some embodiments, for the number of CG consecutive PUSCH allocations within a slot, the first PUSCH allocation follows a configured SLIV parameter, and remaining PUSCH allocations have a same length and PUSCH mapping type, and are appended following previous allocations without any gaps.

In some embodiments, a same combination of start symbol and length and PUSCH mapping type repeats over the consecutively allocated slots.

In some embodiments, the CG resource configuration information for configuring the UE includes information to configure a plurality of PUSCH allocations in the CG time resource based upon the fixed length of the first PUSCH allocation and a number of a plurality of OFDM symbols available for CG uplink transmission in a first slot of the CG time resource.

In some embodiments, the CG resource configuration information for configuring the UE includes information to configure the plurality of PUSCH allocations by: configuring at least one PUSCH allocation that is equal to the fixed length of the first PUSCH allocation; configuring at least one PUSCH allocation that is equal to the fixed length of the first PUSCH allocation and a PUSCH allocation that is less than the fixed length of the first PUSCH allocation; and configuring at least one PUSCH allocation that is equal to the fixed length of the first PUSCH allocation and a PUSCH allocation that is greater than the fixed length of the first PUSCH allocation.

In some embodiments, the transmitting, at the network device to the UE, the CG resource configuration information includes transmitting the CG resource configuration in: a RRC message; or a combination of a RRC message and DCI.

BRIEF DESCRIPTION OF THE DRAWINGS

Embodiments of the present disclosure will be described in greater detail with reference to the accompanying drawings.

FIGS. 3A, 3B, 3C and 3D are example representations of configured grant (CG) resource allocation and transmission according to a first embodiment of the present application.

FIGS. 4A, 4B, 4C and 4D are example representations of CG resource allocation and transmission according to a second embodiment of the present application.

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide a configured grant transmission mode for uplink transmissions in unlicensed spectrum in a wireless network. In this disclosure, configured grant transmissions refer to transmissions that are performed without communicating a dynamic resource grant for the transmission. The configured grant uplink transmission may be a burst transmission. The transmission may include, but is not limited to, one or more physical uplink shared channel (PUSCH), uplink control information (UCI) on a PUSCH, or a demodulation reference signal (DM-RS).

Turning now to the figures, some specific example embodiments will be described.

Communication System

Figure 1:
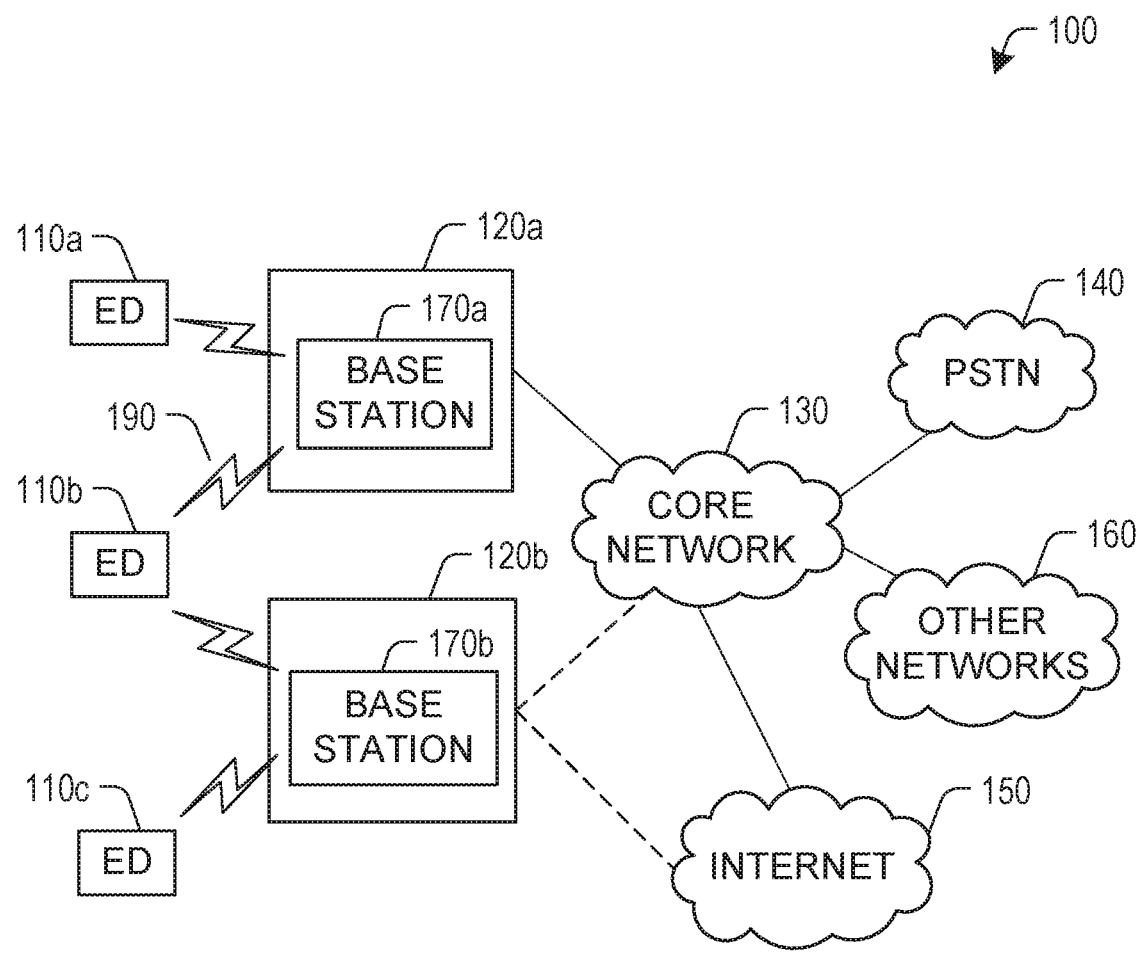
FIG. 1 is a schematic diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 directed or via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c may also communicate with one another over one or more SL air interfaces using wireless communication links e.g. radio frequency (RF), microwave, infrared (IR), etc. The sidelink configured grant resources may be determined by the base station or may be selected from a configured resource pool by the UE initiating the channel occupancy.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support such.

Figure 2A:
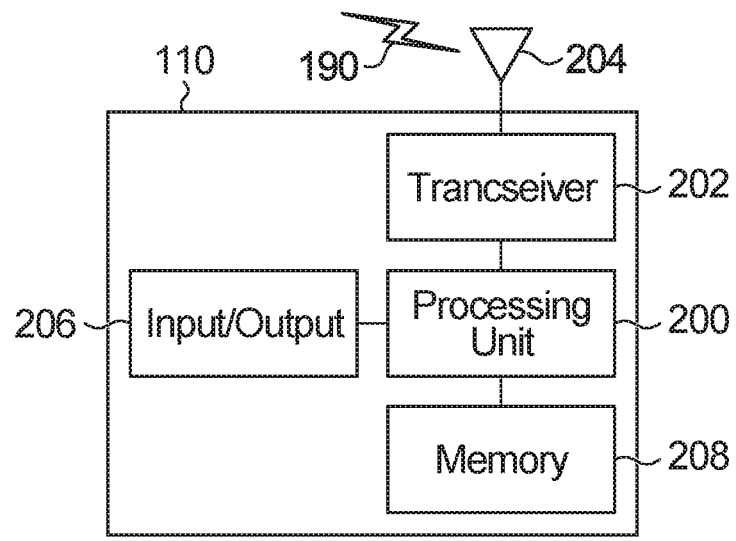
FIGS. 2A and 2B are block diagrams of an example ED and base station, respectively.
Figure 2B:
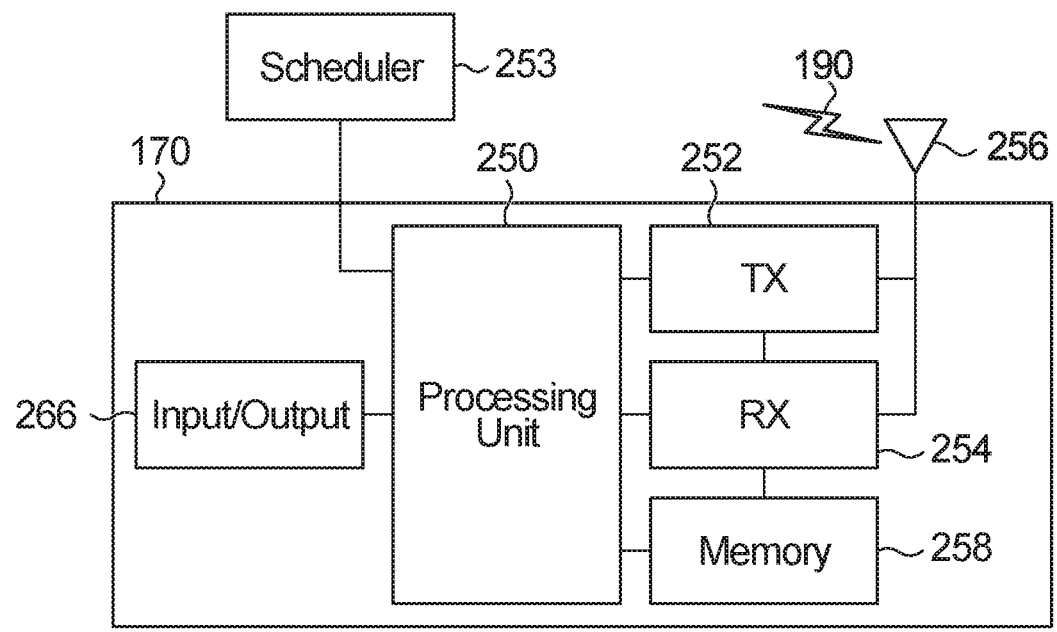

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Configured Grant Transmissions

The base stations 170 are configured to support wireless communication with EDs 110, which may each send configured grant uplink transmissions. Uplink transmissions from the EDs 110 are performed on a set of time-frequency resources. A configured grant uplink transmission is an uplink transmission that is sent using uplink resources without the base stations 170 dynamically allocating resources to request/grant mechanisms. By performing configured grant transmissions, total network overhead resources may be saved. Furthermore, time savings may be provided by bypassing the request/grant procedure. An ED sending a configured grant uplink transmission, or configured to send a configured grant uplink transmission, may be referred to as operating in configured grant mode. Configured grant uplink transmissions are sometimes called "grant-free", "grant-less", "schedule free", or "schedule-less" transmissions. Configured grant uplink transmissions from different EDs may be transmitted using shared designated resource units, in which case the configured grant uplink transmissions are contention-based transmissions. One or more base stations 170 may perform blind detection of the configured grant uplink transmissions.

In a wireless network according to an embodiment, any ED can be configured for grant-based or configured grant transmissions depending on, e.g., the application and device types and requirements. Usually, a configured grant transmission may include resource configuration or resource pre-configuration at the ED connection setup and have resource reconfiguration or an update during operation. In some embodiments, the configured grant resources can be configured for EDs by UE-specific signaling, or broadcast, or multi-cast signaling in some scenarios. Two or more configured grant transmissions can share the same configured resources. Furthermore, in some embodiments, a grant-based transmission can use dedicated resources or can share resources (fully or partially) with configured grant resources in a time interval.

Any of the configured grant and grant-based transmissions can be used for any application traffic or services type, depending on the associated application requirements and quality of service (QoS). By way of a non-limiting example, configured grant transmission can be used for: ultra-reliable low latency communication (URLLC) traffic to satisfy a low latency requirement; enhanced mobile broadband (eMBB) traffic with short packets to save signaling overhead; and eMBB traffic to dynamically take advantage of link adaptation and enhance resource utilization and spectrum efficiency. The present application pertains in particular to using configured grant in unlicensed spectrum to overcome listen-before-talk (LBT) overhead and potential LBT failure for scheduled uplink procedure. Aspects of the present application may mitigate excess latency and may improve the spectrum efficiency.

One ED or a group of EDs may have a group identifier (ID) or Radio Network Temporary ID (RNTI; e.g., configured grant (CG)-RNTI or grant-based (GB) RNTI) to share the same parameter or resource configuration. The group ID can be pre-configured, or dynamically configured to each ED. The parameter or resource configuration to the ED(s) with the group ID can be performed by semi-static or dynamic signaling. In some embodiments, the group ID can be used for, e.g., resource deactivation or activation for the EDs in the group. In some embodiments, for New Radio Configured Grant (NR CG) and Further Enhanced Licensed-Assisted Access (FeLAA) autonomous uplink (AUL), activation and deactivation can be performed through UE-specific downlink control information (DCI). By way of a non-limiting example, the resources being activated or deactivated can include frequency, time, and reference signals (RS) associated with each ED in the group.

Configured grant transmission eliminates the latency and control overhead associated with the scheduling request/grant procedure of grant-based transmission and can allow for more transmission repetitions to increase the likelihood of successful detection or achieve a desired reliability.

For reasons such as the foregoing, uplink configured grant transmission has been agreed to be supported in the 3GPP study item for the 5G New Radio (NR) air interface.

However, for EDs experiencing bad channel conditions and/or persistent resource collisions, switching a transport block (TB) to contention-free grant-based transmission is often desired to ensure successful decoding and/or to exploit link adaptation of uplink scheduling by the base station compared to the pre-configured transport formats used in configured grant transmission.

Configured Grant Resource Structure

To support configured grant transmissions in NR licensed band, the associated resources configured for an ED or a group of EDs can include any or all of the following:

1) Frequency resources in a transmission time interval (TTI), e.g. a symbol, mini-slot or slot. In one example, a physical resource block (PRB) scheme is provided. The PRB scheme indicates physical starting frequency resource block (RB) and allocation size, i.e., number of the RBs allocated.

2) Time resources, including starting/ending position of one data transmission time interval. For example, TTI can be one symbol, mini-slot, or slot.

3) Reference signal (RS) or RS configuration, where each ED can be configured with one or more reference signals (RSs) e.g. demodulation reference signals (DMRSs) depending on scenarios involved. For a group of EDs, each ED may or may not have a different RS or have a different set of RSs. Note that different RSs can be orthogonal or non-orthogonal to each other depending on an application, e.g., such as URLLC application or massive machine-type communication (mMTC) application.

4) ED/ED group specific hopping parameters, which may include one of the following two parameters. One parameter may include a hopping pattern cycle period. In one embodiment, an absolute reference duration (e.g., 20 TTI before repeating itself) is defined. During the absolute reference duration, the number of hopping steps (e.g., 10 times) to take before repeating the hopping pattern again can be determined based on periodicity of time interval resource accessible for configured grant transmissions (e.g., 2 TTI). In another embodiment, an absolute number of hopping times can be defined, for example hopping 20 times before repeating itself. Other parameter(s) may include a hopping pattern index or indices, where one ED may have one or more hopping pattern indices.

5) One or more hybrid automatic repeat request (HARQ) process IDs per ED.

6) One or more modulation and coding schemes (MCSs) per ED, where a configured grant ED can indicate explicitly or implicitly which MCS to use for a transmission.

7) Number of configured grant transmission repetitions K, in which one or more K values can be configured for an ED, where which K value to use depends on certain rule taking into account ED channel conditions, service types, etc.

8) Power control parameters, including power ramping step size (e.g., for an ED).

9) Other parameters, including information associated with general grant-based data and control transmissions. Note that sometimes, a subset of configured grant resources can be referred to as "fixed" or "reserved" resources; whereas a subset of grant-based resources can be referred to as "flexible" resources, which can be dynamically scheduled by a base station.

Hybrid Automatic Repeat Request

As discussed above, the ED 110 may be configured to use a particular set of resources for configured grant transmission. A collision may occur when two or more of the EDs 110 attempt to transmit data on a same set of uplink resources. To mitigate possible collisions, the EDs 110 may use repetitions. A repetition, without grant, of an original configured grant uplink transmission is referred to herein as a "configured grant repetition". Any discussion of a configured grant repetition herein should be understood to refer to either a first or a subsequent repetition. Herein, the term "repetitions" includes both simple repetitions of the transmitted data, as well as repetitions using an asynchronous hybrid automatic repeat request (HARQ), that is, a combination of high-rate forward error-correcting coding and physical layer automatic repeat request (ARQ) error control.

In licensed band NR, a number of automatic configured grant repetitions may be configured, to improve reliability and eliminate latency associated with waiting for an acknowledgement (ACK) or a negative acknowledgement (NACK) message. The repetitions may be performed by the ED 110 until at least one of the following conditions is met:

(1) An ACK message is received from the base station 170 indicating that the base station 170 has successfully received and decoded the TB. The ACK may be sent in a dedicated downlink acknowledgement channel, sent as individual Downlink Control Information (DCI), sent in a data channel, sent as part of a group ACK/NACK, etc.

(2) The number of repetitions reaches K. In other words, if the ED 110 has performed K repetitions and an ACK is still not received from the base station 170, then the ED 110 gives up trying to send the data to the base station 170. In some embodiments, K is semi-statically configured by the base station 170, such that the base station 170 or the network can adjust K over time.

(3) A grant is received from the base station 170 performing a configured grant to grant-based switch.

In an embodiment, the configured grant repetitions may be triggered by receiving a negative acknowledgment (NACK) message, or failing to receive an acknowledgment (ACK) message, e.g., before a timer expires. In an alternative embodiment, K configured grant repetitions are performed irrespective of the response from the base station 170.

The resources over which the one or more configured grant repetitions are performed may be pre-configured, in which case the base station determines the resources based on apriori information. Alternatively, the resources over which the configured grant initial transmission or one or more repetitions are performed may be determined e.g. according to an identifier in a pilot signal of the original configured grant uplink transmission. This may allow the base station to predict, or otherwise identify, which uplink resources will carry the one or more repetitions upon detecting the identifier in the pilot symbol.

Configured grant transmission reduces latency and control overhead associated with grant-based procedures, and can allow for more retransmissions/repetitions to increase reliability. However, due to the lack of uplink scheduling and grant signaling, configured grant EDs may have to be pre-configured to use a fixed modulation and coding scheme (MCS) level at least for initial configured grant transmission. In one embodiment, configured grant EDs are configured to use the most reliable MCS level for a given resource unit for configured grant uplink transmissions.

Unlicensed Spectrum Access

As noted above, given the scarcity and expense of bandwidth in the licensed spectrum, and the increasing demand for data transmission capacity, there is increasing interest in offloading at least some communication traffic, such as uplink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Licensed-Assisted Access (LAA) and enhanced LAA (eLAA) of 3GPP Release (Rel) 13 and Rel 14, respectively, are aimed at porting the spectral-efficient MBB air interface (AI) to the vast and free-of-charge unlicensed spectrum through aggregating unlicensed component carriers (CCs) at the operator's small cells with the assistance of the anchor licensed carriers.

However, UL transmission in eLAA has been built around the GB scheme only. To present a global unlicensed solution, regulatory requirements such as Listen-Before-Talk (LBT) have to be imposed on the medium access design. As such, UL transmission in eLAA has been disadvantaged in terms of latency and successful medium access opportunities due to the multiple contention levels for:

an ED to transmit the scheduling request (SR) e.g., in standalone (SA) deployments, i.e., without an anchor licensed cell;

a Base station to schedule the ED among other EDs;

a Base station to transmit the scheduled grant (especially for self-carrier scheduling); and an ED to pursue the GB transmission.

Aspects of the present disclosure address the challenges of uplink transmission in the unlicensed spectrum by enabling a CG transmission scheme as part of the unified New Radio Unlicensed (NR-U) air interface.

Before an ED can access unlicensed spectrum to transmit on an unlicensed spectrum sub-band, the ED performs a listen-before talk (LBT) operation (for example including initial clear channel assessment (ICCA) and an extended clear channel assessment (ECCA)) in order to check that the channel is idle before transmitting. A sub-band of an unlicensed spectrum band may include a group of frequency resources that comprises one or more unlicensed channels as defined by the IEEE 802.11 standard in the geographical region of operation, or one or more bandwidth parts (BWPs) as defined by wireless communication standards, for example.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting after a successful clear channel assessment (CCA). The CCA mechanism employed in such LBE LBT procedures may be the same CCA mechanism employed in WLAN, i.e. carrier sense multiple access with collision avoidance (CSMA/CA), or it may be based on an energy-detection-based CCA. For example, an energy-detection-based CCA may utilize a random back-off to determine a size of a contention window and a respective maximum channel occupancy time (MCOT) that determines the maximum amount of time that a device may transmit in the unlicensed spectrum once it has successfully contended for a transmission resource.

In FBE LBT procedures, a device attempting to access the unlicensed spectrum can start transmitting only at periodic instants after a short successful energy-detection-based CCA.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random back-off or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random back-off counter or contention window (CW), and if a CCA is terminated due to a 'busy' assessment, that is the channel is busy, the back-off counter is frozen to maintain priority in the next access attempt.

Configured Grant UL Transmission in Unlicensed Spectrum

Methods and devices are provided that address the above challenges associated with supporting configured grant uplink transmission in unlicensed spectrum. In some embodiments, EDs in the same group are configured to align their transmission starting times following the success of respective LBT CCA procedures in order to access the unlicensed spectrum simultaneously and share time-frequency resources or at least time-domain resources of an unlicensed spectrum sub-band for configured grant uplink transmissions.

The configuration or re-configuration can be done through downlink radio resource control (DL RRC) signaling or a combination of RRC signaling and downlink control information (DCI) activation.

In some embodiments of the present disclosure, a group of EDs are configured to align their transmission starting times to a common configured grant transmission cycle characterized by a configured grant transmission cycle reference time and a configured grant transmission cycle period. EDs configured with a same configured grant transmission cycle may be grouped into a same unlicensed spectrum sub-band. An unlicensed spectrum sub-band may include one or more BWPs or one or more unlicensed spectrum channels, e.g. with a bandwidth of 20/40/80/100/160 MHz.

Sub-band time-frequency resources are shared by the group EDs for their respective grant-free uplink transmissions within the sub-band, but because the transmission starting points are aligned in time, the group EDs do not block each other during the CCA procedure.

A numerology is defined as the set of physical layer parameters of the air interface that are used to communicate a particular signal. For OFDM-based communication, a numerology is described in terms of at least subcarrier spacing (SCS) and OFDM symbol duration, and may also be defined by other parameters such as fast Fourier transform (FFT)/inverse FFT (IFFT) length, transmission time slot length, and cyclic prefix (CP) length or duration. As will be discussed in further detail later on, the numerologies used for configured grant UL transmissions in the unlicensed spectrum in accordance with the present disclosure may be selected so as to support certain functionality.

Configured Grant Transmission Cycle Numerology

An aligned configured grant transmission cycle used by a group of configured grant EDs for a given unlicensed spectrum sub-band can be asynchronous with respect to the aligned configured grant transmission cycles used for other unlicensed spectrum sub-band(s). The respective numerologies and Alignment Time Unit (ATUs) used in different unlicensed spectrum sub-bands may also be different. Examples of ATUs include, but are not limited to, slot, mini-slot and symbol.

Frame structures have been proposed that are flexible in terms of the use of differing numerologies. As previously noted, a numerology is defined as the set of physical layer parameters of the air interface that are used to communicate a particular signal. A numerology is described in terms of at least SCS and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are integer multiples of each other, and time slot lengths of different numerologies are also integer multiples of each other. In some sets of scalable numerologies, the subcarrier spacings and time slot lengths differ by a factor of $2^n$. Such a scalable design across multiple numerologies provides implementation benefits, for example scalable total OFDM symbol duration in a time division duplex (TDD) context.

When multiple EDs share a frequency resource, each ED can use one or more frequency interlaces when transmitting the UE's respective configured grant UL bursts. Therefore, in some embodiments, different EDs each use a respective set of orthogonal frequency interlaces to transmit their respective configured grant UL bursts within the unlicensed sub-band.

One type of transmission with configured grant (TCG) that is being contemplated for NR, referred to as Type 1 NR TCG, includes using radio resource control (RRC) signaling to provide configuration information to an ED. Examples of configuration information include, but are not limited to, periodicity, offset, time-frequency allocation, ED-specific demodulation reference signals (DMRS) configuration, modulation coding scheme/transmit block size (MCS/TBS), number of repetitions (K) and power control.

In a second type, referred to as Type 2 NR TCG, RRC signaling can be used to provide some of the configuration information to an ED and other configuration information is provided to the ED in activation downlink control information (DCI). Examples of the configuration information that might be provided in RRC signaling include, but are not limited to, periodicity, power control, number of repetitions (K), and MCS/TBS. Examples of configuration information that may be provided in the activation DCI include, but are not limited to, offset, time-frequency allocation, MCS/TBS and ED-specific DMRS configuration information.

With regard to time-domain resource allocation for the configured grant transmission in unlicensed spectrum, the following two parameters are configured through RRC signalling for both Type1 and Type 2 identified above.

K-repetitions: for example K={1, 2, 4, 8} consecutive transmissions of the same PUSCH.

Periodicity: The following periodicities may be supported depending on the configured subcarrier spacing:

15 kHz: 2, 7, n*14, where n={1, 2, 4, 5, 8, 10, 16, 20, 32, 40, 64, 80, 128, 160, 320, 640};

30 kHz: 2, 7, n*14, where n={1, 2, 4, 5, 8, 10, 16, 20, 32, 40, 64, 80, 128, 160, 256, 320, 640, 1280};

60 kHz with normal CP: 2, 7, n*14, where n={1, 2, 4, 5, 8, 10, 16, 20, 32, 40, 64, 80, 128, 160, 256, 320, 512, 640, 1280, 2560}; and 60 kHz with extended CP (ECP): 2, 6, n*12, where n={1, 2, 4, 5, 8, 10, 16, 20, 32, 40, 64, 80, 128, 160, 256, 320, 512, 640, 1280, 2560}.

The following two parameters are configured via RRC for Type 1 and via activation DCI for Type 2:

timeDomainAllocation: Allocation of configured uplink grant in time domain which indicates a table entry containing startSymbolAndLength; and timeDomainOffset: Offset of a resource with respect to system frame number (SFN)=0 in time domain in case of Type 1 and with respect to the slot in which the activation DCI was transmitted in case of Type 2.

There are several potential problems with the existing Type 1 and Type 2 procedures for transmission configured grant if they were to be applied to operation in unlicensed spectrum.

In the case of Type 1 and Type 2 procedures, for a configured grant capable ED that has a transmission ready to transmit, the ED may not be able to gain access to a pre-configured resource as a result of an LBT failure. The transmission may be a burst transmission. The transmission may include, but is not limited to, one or more physical uplink shared channel (PUSCH), uplink control information (UCI) on a PUSCH, or a demodulation reference signal (DM-RS). If the ED attempts to access the channel before the configured time resource of a period, and if such a LBT failure occurs, the ED would have to defer channel access until the next configured grant period. A K-repetition configuration is not useful in such case. Depending on a Redundancy Version (RV) value, if the first transmission misses a first slot, a retransmission may not be able to start at a subsequent slot over which the remaining of K repetitions are configured. The existing Type 1 and Type 2 procedures involve configuring a start symbol and a length of a configured grant opportunity that is applied to every grant free slot. Such a procedure may be too restrictive if gaps within burst transmission are to be avoided. The procedure may be too restrictive because any configuration that has a starting symbol other than a first orthogonal frequency domain multiplexed (OFDM) symbol (OS #0, when there are 14 OFDM symbols in a slot) and/or a PUSCH length that does not end at a last OFDM symbol (OS #13) may result in gaps between the slots of the CG time resource. Depending on subcarrier spacing, such gaps can be sufficient for other nodes to acquire the channel.

When the CG time resource has more than one access occasion this enables the ED to access the resource and begin transmission at one of multiple locations within the CG time transmission resource. The term "access occasion" is intended to define a channel access starting point, not a particular duration of time within the CG time transmission resource. Before the beginning of a first access occasion within the CG time resource, the ED performs a first LBT procedure to access the channel at the access occasion. If the first LBT is successful, the ED can start transmission on the PUSCH at the first transmission occasion. However, if the LBT fails, the ED does not defer the channel access for the remaining configured period as would happen with existing procedures. Instead of deferring to the next configured time resource, the ED attempts another LBT before a second access occasion in the CG time resource. If the LBT is unsuccessful in the second transmission occasion the ED attempts an LBT before a third access occasion. The ED continues attempting to perform an LBT at subsequent access occasions until the LBT is successful or the ED exhausts all the access occasions in the current CG time transmission resource. If the ED is in unable to start transmission at any of the access occasions in the current CG time transmission resource, the ED can defer to access occasions in the next CG time transmission resource within the subsequent period.

In a previously filed patent application (U.S. patent application Ser. No. 15/694,558 filed Sep. 1, 2017) assigned to the assignee of the present application, a grant free (GF) solution for NR-U to improve resource utilization subject to LBT was disclosed. The disclosure involves configuring a selected set of UEs with same time-domain resources, and either orthogonal or same frequency interlaces on the same unlicensed channel, while aligning their access starting points to avoid mutual blocking during LBT. The disclosure also involves configuring the UE with multiple access occasions over the pre-configured time resource. Before the beginning of the pre-configured period, the UE performs the LBT procedure towards accessing a first access occasion. If the LBT is successful, the UE transmits on one or more PUSCHs. However, if the LBT fails, the UE does not defer the channel access for the remaining pre-configured period and attempts to access the channel at the next access occasion in the same period.

However, using the proposed solution in conjunction with conventional NR resource configuration for Type 1 and Type 2 involves some form of modification to the NR resource configuration process. U.S. Provisional Patent Application No. 62/739,106 filed Sep. 28, 2018, assigned to the assignee of the present application, disclosed a method for time-domain resource configuration for transmission with configured grant (CG) in the unlicensed spectrum. Among the enhancements to NR Rel-15 CG were an indication of a CG time domain resource duration within a period of a transmission resource and time domain resource allocation information identifying multiple access occasions for the UE to start a CG uplink transmission within the CG time domain resource duration upon a successful LBT procedure.

A subsequent modification includes providing two options for physical uplink shared channel (PUSCH) resource allocation and transmission based on a proposed method of multiple channel access occasions were captured as:

1) Each PUSCH is configured to span the number of symbols between two consecutive channel access occasions, e.g., using length L from the parameter startSymbolandLength (SLIV); and 2) Each PUSCH is configured to span a full slot ending at the slot boundary. The first PUSCH starts at the symbol marking the occasion at which an LBT procedure succeeds. Puncturing and/or rate matching may also be utilized if the transmission of the first PUSCH starts after a first OFDM symbol of a slot or mini-slot.

The above two options comply with earlier agreements in NR that a PUSCH is not allowed to cross the slot boundary. However, the second option has been precluded by a recent agreement to avoid puncturing/rate matching at the ED side and the associated complexity at the base station side.

For operation in unlicensed spectrum, gaps between resources allocated in consecutive CG slots should be avoided. The first option described above works well only with two or seven OFDM symbol mini-slot PUSCHs (considering 14 OFDM symbols per slot). There may be benefits to using mini-slot PUSCHs having more than two OFDM symbols and less than the full number of OFDM symbols in the slot. However, this may lead to gaps between resources allocated in consecutive CG slots or to all of the mini-slot PUSCHs not being equal in size, i.e., length in OFDM symbols. Aspects of the present application propose solutions for using multiple mini-slot PUSCHs having the same or different size.

Starting an uplink transmission every seven OFDM symbols is a granularity suitable for subcarrier spacing of 60 kHz or above, but may not be suitable for 15 and 30 kHz subcarrier spacing supported in NR-U. Aspects of the present application propose solutions for using mini-slot PUSCHs having smaller than seven OFDM symbols to support 15 and 30 kHz subcarrier spacing.

CG PUSCH can carry both demodulation reference signal (DMRS) and uplink control information (UCI) in addition to the data payload. A PUSCH of length two OFDM symbols may not offer sufficient resources due to the high overhead. Aspects of the present application propose solutions for using mini-slot PUSCHs having a size larger than two OFDM symbols, but less than seven OFDM symbols when SCS of 60 kHz or less is used that allow sufficient resources including overhead.

Each PUSCH carries a corresponding HARQ ID in the uplink control information (UCI). An implementation using PUSCHs that are all two OFDM symbols in duration occupies too many HARQ processes, thus limiting the ability to transmit new transport blocks (TBs) in long bursts or when frequent retransmissions are needed, or both. Aspects of the present application propose solutions for using mini-slot PUSCHs having a size larger than two OFDM symbols, but less than seven OFDM symbols that can potentially reduce the number of HARQ ID that are required.

In NR Re1.15, a UE may only support two or four time divisional multiplexed (TDMed) PUSCHs per slot for different TBs. Some UEs may not support seven time division multiplexed (TDMed) PUSCHs per slot. Aspects of the present application propose solutions for using mini-slot PUSCHs having larger than two OFDM symbols to enable more than two TDMed PUSCHs per slot.

As such, enhancements are needed to provide more flexibility in configuring/indicating PUSCH duration/channel access occasions In some embodiments, indications used to define particular implementations proposed in the disclosure are also provided. The indications may be transmitted by a network side device in radio resource control (RRC) messages or downlink control information (DCI) signalling, or both.

In the present application, the expression configured grant (CG) time resource is intended to refer to a transmission resource used for configured grant transmissions (CG). In particular embodiments of the disclosure, CG transmissions are CG uplink transmissions. The CG time resource may be composed of multiple CG time resource durations. The CG uplink transmissions may be transmitted using one or more physical uplink shared channels (PUSCH) in a CG time resource duration. Each PUSCH includes one or more OFDM symbols. In some embodiments, the CG time resource duration may be referred to as a slot. In such a case a slot may be considered to include multiple PUSCH durations. When there are more than one PUSCH duration in the slot, for the purposes of the disclosure, these PUSCH durations may be referred to herein as mini-slot PUSCHs, as they are less than the size of a slot. This sub-slot sized PUSCH duration may also be referred to as sub-slot PUSCH, partial slot PUSCH, or partial subframe PUSCH.

Aspects of the present application provide for flexibility in configuring channel access occasions for uplink transmissions within a configured grant transmission resource duration. One non-limiting example of a transmission resource duration may be a slot. The uplink transmission may be transmitted in the physical uplink shared channel (PUSCH). The configured grant transmission resource duration includes multiple orthogonal frequency division multiplexed (OFDM) symbols. In a particular embodiment, the number of OFDM symbols (OS) in the slot is 14. The PUSCH typically spans all, or a subset of, the 14 OS in a slot. In some implementations, resources for uplink transmissions are allocated such that an integer number of equally sized mini-slots, each of which is considered a separate PUSCH, fit within the slot. This occurs when the number of OFDM symbols within the slot is evenly divisible by the number of OFDM symbols in the mini-slot. For example for a total of 14 OFDM symbols per slot, there are two possible outcomes for a mini-slot larger than a single OFDM symbol. The two outcomes are two OFDM symbols per mini-slot resulting in seven mini-slots per slot or seven OFDM symbols per mini-slot resulting in two mini-slots per slot. In some embodiments, not all of the mini-slots in the slot are equal in size. This occurs when the number of OFDM symbols within the slot is not evenly divisible by a particular mini-slot size. The result is that there are a number of same sized mini-slots and one mini-slot that has either a smaller or larger number of OFDM symbols than the other same sized mini-slots. These mini-slots may be referred to in this disclosure as PUSCH durations. The resources for the smaller or larger OFDM symbol sized mini-slot can be either allocated at a beginning of a slot or at an end of the slot. A first access occasion in a slot may start at a first OFDM symbol of the slot or at an alternately defined OFDM symbol that is not the first OFDM symbol in the slot. In some embodiments, the arrangement of mini-slots in a first slot may be configured the same as second or subsequent slots, or differently than second or subsequent slots. In some embodiments, all the slots may be configured in the same manner, but after a successful channel access in a first slot using an LBT procedure, second and subsequent slots after the first slot may use a default or pre-configured PUSCH resource allocation. Examples of the various embodiments are described in further detail below.

In some embodiments, the network configures the UE by indicating to the UE time domain allocation information. This may include for example providing the SLIV (startSymbolAndLength) parameter. The UE can determine time domain resources for multiple PUSCHs in a slot, and thus locations of access occasions, based on the values of L, S, (provided in the SLIV parameter) and other configuration parameters, such as whether the smaller or larger OFDM symbol sized mini-slots are at the beginning or end of a slot and if a default configuration is used for slots after a first slot in which the ED successfully accesses the channel.

Although the various embodiments described below generally refer to configured grant (CG) uplink transmissions in unlicensed spectrum, it is understood that the principles described could be applied to semi-persistent scheduling (SPS) in downlink, sidelink transmissions, or V2X transmissions in licensed or unlicensed spectrum.

A first embodiment enables configuring multiple PUSCHs and thus multiple access occasions in the configured grant (CG) uplink transmission resource duration for transmitting CG UL transmissions on multiple same sized mini-slot PUSCHs and a mini-slot PUSCH smaller than the same sized PUSCHs in accordance with the LBT results. When resources are allocated for the smaller mini-slot PUSCH at the end of the CG uplink transmission resource duration, this may be referred to as a first alternative (Alt-1). Whereas, when resources are allocated for the smaller mini-slot PUSCH at the beginning of the CG uplink transmission resource duration, it is referred to as a second alternative (Alt-2). Examples illustrating Alt-1 and Alt-2 will be provided below.

FIG. 3A illustrates a transmission resource to be used for a configured grant (CG) resource 300 that includes two full slots 310,320 and portion of a third slot 330. Although only three slots are shown, this is only a partial view of a CG resource to focus on the disclosed details. It is to be understood that more or fewer slots may be included in each CG resource, depending on the implementation. Each slot includes 14 OFDM symbols (OSs), one of which is identified as 310a. The OFDM symbols shown in the top row 302 of OS are a representation of a possible configuration of mini-slot PUSCHs within the slots. The bottom row 305 of OSs are a representation of mini-slot PUSCHs within the slots that are used for CG uplink transmission upon a successful listen-before-talk (LBT) procedure at one of multiple access occasions. Referring to the first slot 310, it can be seen that there are three mini-slot PUSCHs 306a, 306b, 306c of four OFDM symbols in duration each, i.e. L=4, and a single mini-slot 306d that is only two OFDM symbols in duration for a total of 14 OFDM symbols. The first mini-slot PUSCH 306a is configured to start (S) at the first OFDM symbol 310a of the first slot 310, i.e. S=0. Therefore, a first access occasion 307a is configured to start on the first OFDM symbol (OS #0), a second access occasion 307b is configured to start on the fifth OFDM symbol (OS #4), a third access occasion 307c is configured to start on the ninth OFDM symbol (OS #8) and a fourth access occasion 307d, which would be for a shorter mini-slot, starts on the 13th OFDM symbol (OS #12). The three mini-slots 306a, 306b, 306c each having four OFDM symbols are arranged first, followed by the single mini-slot 306d that is only two OFDM symbols. This same pattern is configured for the subsequent second and third slots 320, 330 in FIG. 3A.

As illustrated in the bottom row 305 of OS, for the first two access occasions 307a, 307b, the LBT procedure is unsuccessful and so no CG UL transmissions occur on the configured mini-slot PUSCHs 306a, 306b. At the third access occasion 307c, the LBT procedure is successful and the third configured mini-slot PUSCH 306c is used to transmit a CG uplink transmission (PUSCH 1) of four OFDM symbols. Once PUSCH 1 is transmitted in the third mini-slot PUSCH 306c, an additional CG uplink transmission (PUSCH 2) occupying two OFDM symbols is transmitted using the configured shorter mini-slot PUSCH 306d to avoid creating gaps between the consecutive slots of the CG time resource. Because the channel has been accessed, CG uplink transmissions are sent in the second and third slots 320, 330. In the second and third slots 320, 330, the configuration shown in the top row 302 of OFDM symbols is used for CG uplink transmission as shown in the bottom row 305 of OFDM symbols, i.e. three mini-slot PUSCHs of four OFDM symbols in duration each and a single mini-slot PUSCH that is only two OFDM symbols in duration (PUSCH 3, PUSCH 4, PUSCH 5, PUSCH 6 and PUSCH 7). More generally, as the CG resource may be longer than three slots, CG uplink transmissions continue in slots until the channel is released.

The number of configured same sized mini-slot PUSCHs in FIG. 3A is shown to be three, but more generally it can be denoted as n. The number of OFDM symbols in a mini-slot PUSCH is shown to be four, but more generally can be denoted as L, e.g., as indicated by the SLIV parameter. The number of OFDM symbols in a slot, or more generally a CG uplink transmission resource duration, is shown to be 14, but more generally can be denoted as $N_{symbol}$. If $L<N_{symbol}$, then the UE interprets L as the length of the first, or last, n consecutive mini-slots within each CG uplink transmission resource duration of the CG time resource duration. In some embodiments, n can be configured as $$n = \left\lfloor \frac{N_{symb}}{L} \right\rfloor.$$

If $L_{short}=N_{symb}-nL>0$, i.e. mod($N_{symb}$, L)≠0, then a shorter mini-slot PUSCH can be introduced at the end, or at the beginning, of each CG uplink transmission resource duration of the CG time resource duration. If $L_{short}=0$, then the number of OFDM symbols in the CG uplink transmission resource duration is evenly divisible by the number of OFDM symbols, L, in the mini-slot PUSCH resulting in an integer number n of same sized mini-slots and no mini-slots of a different size.

Allowable values for L may be limited such that $L_{short} \geq L_{min}$, which is a predefined or preconfigured minimum CG PUSCH length determined based on one or more of: demodulation reference signal (DMRS) and uplink control information (UCI) overhead, frequency domain resources (full bandwidth, interlace based, subband, wideband), number of HARQ processes configured for CG operation, and UE capability for time division multiplexing (TDM) of PUSCHs with different transport block sizes (TBS) in a slot. It may be useful to have a minimum value of the PUSCH length, $L_{min}$, because if the mini-slot PUSCH has less than a minimum defined number of OFDM symbols, there may not be a sufficient number of OFDM symbols to support both overhead and payload.

If $L=N_{symbol}$, then a full slot allocation can be used with potential channel access at slot boundaries. However, the channel access probability may not be suitable for the subcarrier spacings of 60 kHz or less that are supported in NR-U.

In FIG. 3A S is set to 0 as the starting symbol of the first mini-slot PUSCH in each slot of the CG resource duration when configuring the CG resource duration. In some embodiments, S is set to some other value than 0. In embodiments where S≠0, using S≠0 is applied to the first mini-slot PUSCH in the first slot. Subsequent slots in a CG resource duration revert to S=0.

FIG. 3B illustrates an embodiment for a CG time resource 300 having two full slots 310, 320 and a portion of a third slot 330 with each slot having 14 OFDM symbols. Although only three slots are shown, this is only a partial view of a CG resource to focus on the disclosed details. It is to be understood that more or fewer slots may be included in each CG resource, depending on the implementation. In this example, S is not equal to 0, but set equal to a value of mod (14,L). In this case, L=4 and so the value of S=2. In this example the value of S is equal to the value of $L_{short}$ in FIG. 3A. This is convenient when the remaining number of OFDM symbols within the slot is evenly divisible by L, which is the number of OFDM symbols in the mini-slot PUSCHs. In this particular scenario, as shown in the top row 302 of OFDM symbols illustrating configuration of the slots, the first mini-slot PUSCH 346a is configured to begin at the third OFDM symbol (OS #2), the second mini-slot PUSCH 346b is configured to begin at the seventh OFDM symbol (OS #6), and the third mini-slot PUSCH 346c is configured to begin at the eleventh OFDM symbol (OS #10). This arrangement fills all the OFDM symbols of the first slot 310. As indicated above, in the second and subsequent slots 320, 330, S is set equal to 0 despite that S=2 is indicated in the configuration information and the arrangement of mini-slot PUSCHs begins from the first OFDM symbol of the respective subsequent slot. In the second row 305 of OFDM symbols, it can be seen that the first two LBT procedures at the first two access occasions 347a, 347b are unsuccessful and so there is no channel access as of the first two access occasions. On the third access occasion 347c the LBT procedure is successful and a CG uplink transmission (PUSCH 1) occurs in the third mini-slot PUSCH 346c.

The second slot 320 has a similar configuration as the second slot 320 of in FIG. 3A and a similar transmission format of using three mini-slot PUSCHs 348a, 348b, 348c of the same size for transmitting CG uplink transmissions (PUSCH 2, PUSCH 3, PUSCH 4) and a single mini-slot PUSCH 348d for transmitting a CG uplink transmission (PUSCH 5). The third slot 330 and subsequent slots have the same configuration and transmission arrangements until releasing the CG uplink transmission resource.

Figure 3C:
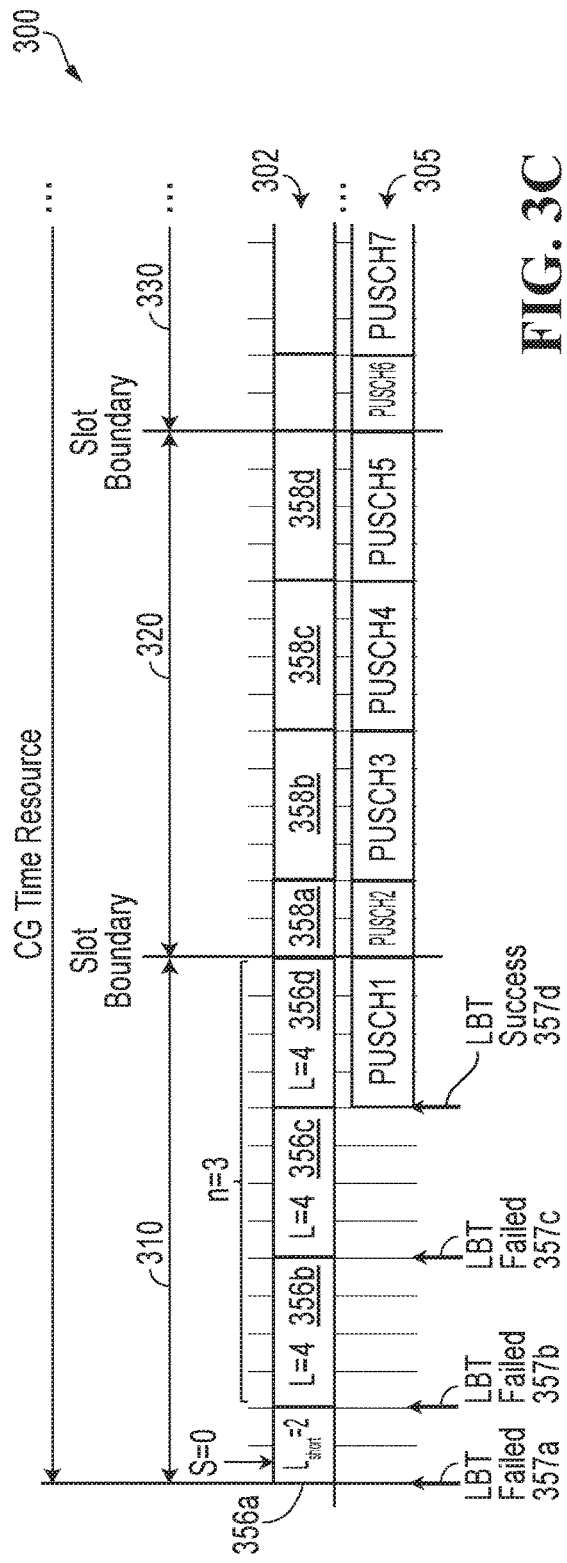

FIG. 3C shows another alternative for a CG time resource 300 that is similar to FIG. 3A in that there are multiple same sized mini-slots and a single smaller sized mini-slot in a single slot. Although only three slots are shown, this is only a partial view of a CG resource to focus on the disclosed details. It is to be understood that more or fewer slots may be included in each CG resource, depending on the implementation. The difference is that in FIG. 3C the single smaller sized mini-slot PUSCH is allocated for the beginning of the slot, which as indicated above is referred to as Alt-2. FIG. 3C illustrates in the top row 302 of OFDM symbols a configuration with the single smaller sized mini-slot PUSCH 356a starting at the first OFDM symbol (S=0) and then the three consecutive same sized mini-slot PUSCHs 356b, 356c, 356d fill out the remainder of the 14 OFDM symbol slot. As shown in the bottom row 305 of OFDM symbols, the first three LBT procedures are unsuccessful at the first three access occasions 357a, 357b 357c, but the fourth LBT procedure is successful at the fourth access occasion 357d and so a first CG uplink transmission (PUSCH1) is transmitted on the third mini-slot PUSCH 356d. On the second slot 320, CG uplink transmissions (PUSCH 2, PUSCH 3, PUSCH 4, PUSCH 5) are transmitted in the mini-slot PUSCHs 358a, 358b, 358c, 358d. Subsequent slots 330 would have additional CG uplink transmissions in associated mini-slots.

Figure 3D:
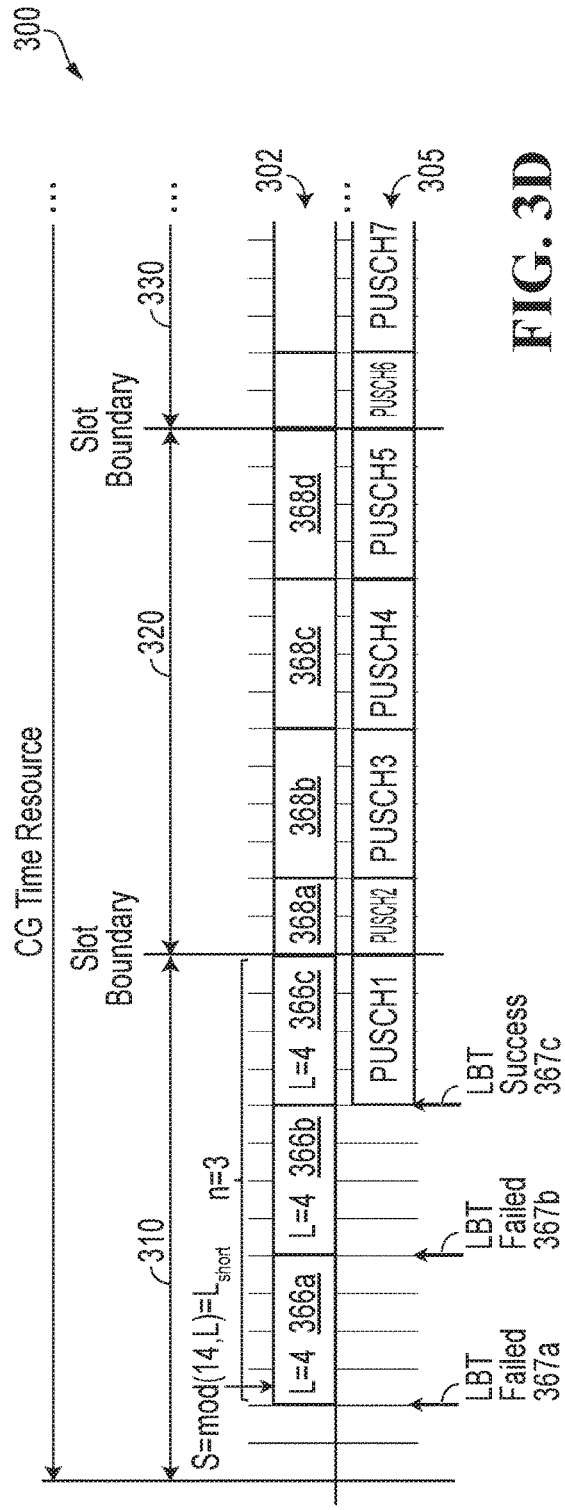

FIG. 3D illustrates an embodiment for a CG time resource 300 having two full slots 310, 320 and a portion of a third slot 330 with each slot having 14 OFDM symbols. Although only three slots are shown, this is only a partial view of a CG resource to focus on the disclosed details. It is to be understood that more or fewer slots may be included in each CG resource, depending on the implementation. In this example, S is not equal to 0, but set equal to mod (14,L). In this case, L=4 and so the value of S=2. S is the same as in FIG. 3B and therefore, the first slot 310 in FIG. 3D has the same configuration as slot 310 in FIG. 3B. In this particular scenario, as shown in the top row 302 of OFDM symbols illustrating configuration of the slots, the first mini-slot PUSCH 366a is configured to begin at the third OFDM symbol (OS #2), the second mini-slot 366b is configured to begin at the seventh OFDM symbol (OS #6), and the third mini-slot 366c is configured to begin at the eleventh OFDM symbol (OS #10). This arrangement fills all the OFDM symbols of the first slot 310. As indicated above, in the second and subsequent slots 320,330, S is set equal to 0, despite that S=2 is indicated in the configuration information and the arrangement of mini-slot PUSCHs begins from the first OFDM symbol of the respective slot. In the second row 305 of OFDM symbols, it can be seen that the first two LBT procedures are unsuccessful at the first two access occasions 367a, 367b and so there is no channel access at the first two mini-slots 366a, 366b. On the third access occasion 367c the LBT procedure is successful and a CG uplink transmission (PUSCH 1) occurs in the third mini-slot 366c.

As can be seen from FIG. 3D, when S is set to a value that is not 0, a gap is introduced at the beginning of the slot. The network may take advantage of this type of flexibility to purposely create a gap before the start of the CG uplink transmission. The network may want to utilize such a gap for various reasons; one reason may be to allow the UE to perform LBT after the end of other DL or UL transmissions.

The second slot 320 has a similar scheduling configuration as the second slot 320 in FIG. 3C and a similar transmission format of the CG transmission (PUSCH 2) in the single mini-slot PUSCH 368a and CG transmissions (PUSCH 3, PUSCH 4, PUSCH 5) in mini-slot PUSCHs 368b, 368c, 368d. The third slot 330 and subsequent slots have same configuration and transmission arrangements until releasing the CG uplink transmission resource.

It should be noted that, in a more generalized form of the configurations in examples in FIG. 3B and FIG. 3D, S can be configured as $=\mathrm{mod}(N_{symb},L)+m\,L$, where $m=0,1,\ldots,$ $$\left\lfloor \frac{N_{symb}}{L} \right\rfloor - 1,$$

whereas the number of configured mini-slot PUSCHs of length L in the first slot is configured as $$n = \left\lfloor \frac{N_{symb} - S}{L} \right\rfloor.$$

In order to notify the UE whether the shorter mini-slot PUSCH with fewer OFDM symbols is configured at the beginning of the slot (Alt-1) is supported or the shorter mini-slot PUSCH is configured at the end of the slot (Alt-2) is supported, the network device may send some form of message. For example, an indication bit can be provided either in radio resource control (RRC) messaging or in an activation downlink control indication (DCI) to indicate whether Alt-1 or Alt-2 is configured.

Because two different sized PUSCHs may be used in the same configuration, the transport block size (TBS) can be maintained for both OFDM sized PUSCHs or a different TBS can be used for the different OFDM sized PUSCHs. In order to maintain a same TBS size, a base station can indicate in RRC (for Type 1 or Type 2) or in DCI for Type 2, a higher MCS value to be used with the CG uplink transmission in the shorter mini-slot PUSCH. Otherwise, if the same MCS level is used for all CG transmissions, the UE derives a smaller TBS, e.g., from the indicated mcsAndTBS parameter, to be used only with the transmissions of the shorter mini-slot PUSCH.

In some embodiments, the shorter mini-slots may be used for some other form of information than payload data. For example, the information sent in the shorter mini-slots may be used for transmitting sounding reference signal (SRS), channel state information (CSI), channel quality information (CQI), or other information that is not configured by the base station.

A second embodiment enables configuring multiple access occasions in the CG transmission resource duration for transmitting multiple same sized mini-slots and a mini-slot longer than the same sized mini-slots.

Figure 4A:
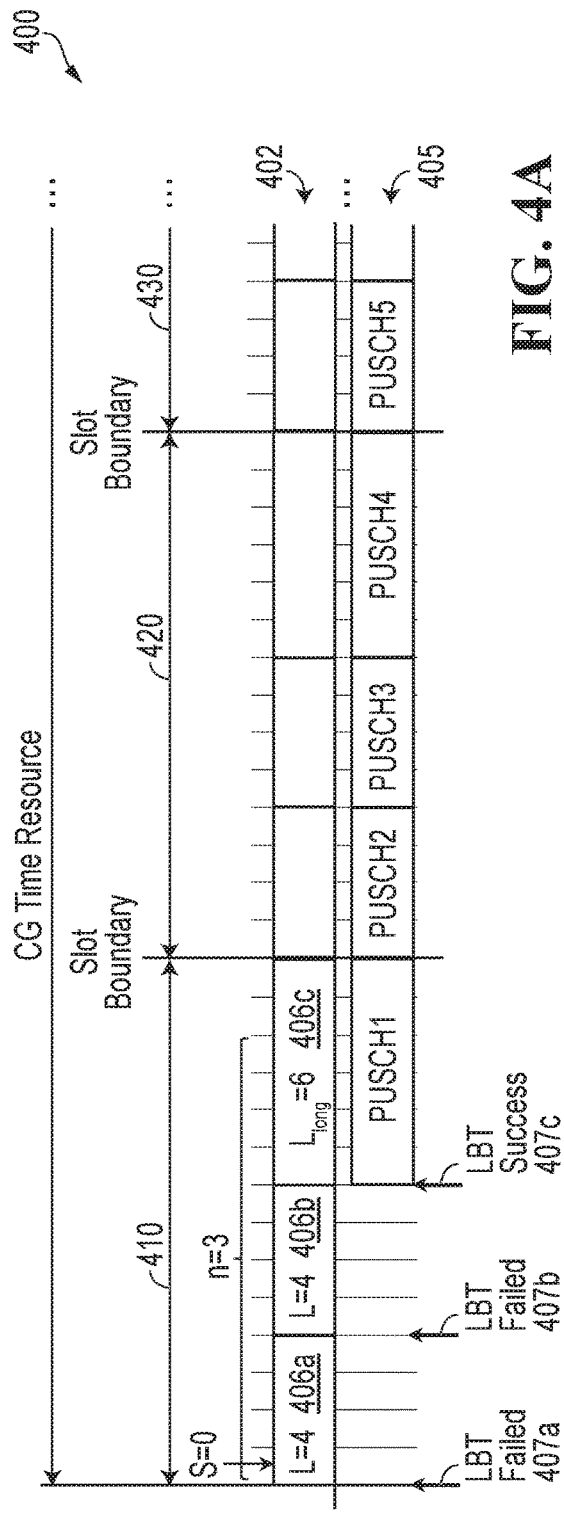

FIG. 4A illustrates a transmission resource to be used for a CG time resource 400 that includes two full slots 410, 420 and portion of a third slot 430. Although only three slots are shown, this is only a partial view of a CG resource to focus on the disclosed details. It is to be understood that more or fewer slots may be included in each CG resource, depending on the implementation. Each slot includes 14 OFDM symbols. The OFDM symbols shown in the top row 402 are a representation of a possible configuration for mini-slot PUSCHs within the slots and the bottom row 405 of OFDM symbols are a representation of mini-slot PUSCHs within the slots that are used for CG uplink transmission upon a successful LBT procedure at one of multiple access occasions. Referring to the first slot 410, it can be seen that there are two mini-slot PUSCHs 406*a*, 406*b* of four OFDM symbols in duration each, i.e. L=4, and a single mini-slot PUSCH 406*c* that is six OFDM symbols in duration for a total of 14 OFDM symbols. The first mini-slot PUSCH 406*a* is configured to start (S) at the first OFDM symbol of the first slot 410, i.e. S=0. Therefore, a first access occasion 407*a* is configured to start on the first OFDM symbol (OS #0), a second access occasion 407*b* is configured to start on the fifth OFDM symbol (OS #4), and a third access occasion 407*c*, which would be for the longer mini-slot, is configured to start on the ninth OFDM symbol (OS #8). As a result, the two mini-slot PUSCHs 406*a*, 406*b* of four OFDM symbols are arranged first, followed by the single mini-slot PUSCH 406*c* that is six OFDM symbols in duration. As this longer mini-slot PUSCH is configured at the end of the slot, this embodiment is referred to as Alt-1, as indicated above. This same pattern is configured for the subsequent second and third slots 420, 430 in FIG. 4A. As illustrated in the bottom row 405 of OFDM symbols, for the first two access occasions 407*a*, 407*b*, the LBT procedure is unsuccessful and so no CG uplink transmission occurs in the first two mini-slot PUSCHs 406*a*, 406*b*. At the access occasion 407*c*, the LBT procedure is successful and the third mini-slot PUSCH 406*c* is used to transmit a CG uplink transmission (PUSCH 1) of six OFDM symbols. Once PUSCH 1 is transmitted, additional CG uplink transmissions continue on the second and third slots 420, 430. In the second and third slots 420, 430, the configuration shown in the top row 402 is used for CG uplink transmission (PUSCH 2, PUSCH 3, PUSCH 4, and PUSCH 5) shown in the bottom row 405, i.e. two mini-slot PUSCHs of four OFDM symbols in duration each and a single mini-slot PUSCH that is six OFDM symbols in duration. More generally, as the CG resource may be longer than three slots, CG uplink transmissions continue in slots until the channel is released.

The number of OFDM symbols in a mini-slot PUSCH is shown to be 4, but more generally can be denoted as L. The number of OFDM symbols in a slot, or more generally a CG uplink transmission resource duration, is shown to be 14, but more generally can be $N_{symbol}$. If $L<N_{symbol}$, then L is the length of the first, or last, n−1 consecutive mini-slot PUSCHs within each CG uplink transmission resource duration of the CG resource duration. In some embodiments, n can be configured as $$n = \left\lfloor \frac{N_{symb}}{L} \right\rfloor.$$

If mod($N_{symbol}$,L)>0, then a longer mini-slot PUSCH having $L_{long}$=L+mod($N_{symbol}$,L) OFDM symbols can be introduced at the end, or at the beginning, of each slot of the CG resource duration. If mod($N_{symbol}$,L)=0, the number of OFDM symbols in the CG uplink transmission resource duration is evenly divisible by the number of OFDM symbols, L, in the mini-slot PUSCH resulting in an integer number of same sized mini-slot PUSCHs and no mini-slot PUSCH of a different size.

Allowable values for L may be limited such that L≥$L_{min}$, which is a predefined or preconfigured minimum CG mini-slot length determined based on one or more of: demodulation reference signal (DMRS) and uplink control information (UCI) overhead, frequency domain resources (full bandwidth, interlace based, subband, wideband), number of HARQ processes configured for CG operation, and ED capability (also know as UE capability as an ED may be UE) for time division multiplexing (TDM) of PUSCHs with different transport block sizes (TBS) in a slot. In this case L must be greater than the $L_{min}$, because L is the smaller of the two possible mini-slot sizes, as opposed to the embodiments described above in which the single mini-slot having a different size has fewer OFDM symbols than the other min-slots and must be greater than or equal to $L_{min}$.

If L=$N_{symbol}$, then a full slot allocation can be used with potential channel access at slot boundaries. However, the channel access probability may not be suitable for the subcarrier spacings of 60 kHz or less that are supported in NR-U.

In FIG. 4A S is set to 0 as the starting symbol of the first mini-slot PUSCH in each slot of the CG resource duration. In some embodiments, S is set to some other value than 0. In embodiments where S #0, using S #0 is only applied to the first mini-slot PUSCH in the first slot. Subsequent slots in a CG resource duration revert to S=0.

Figure 4B:
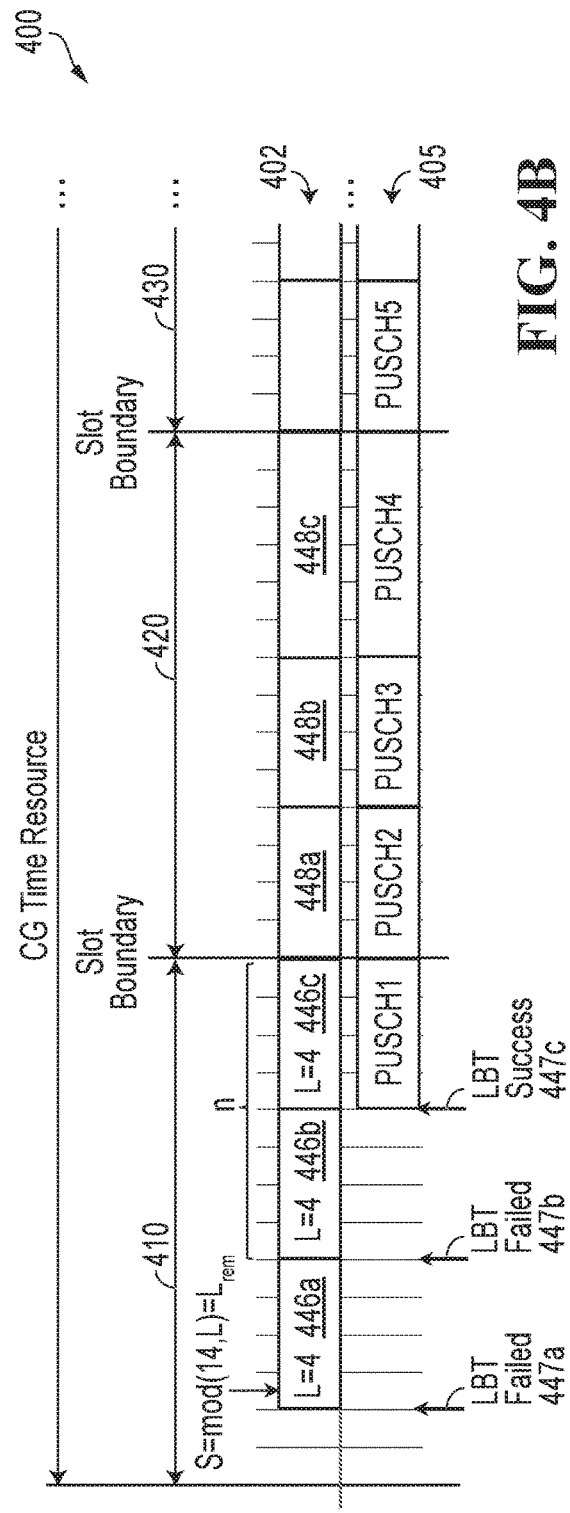

FIG. 4B illustrates an embodiment for a CG time resource 400 having two full slots 410, 420 and a portion of a third slot 430 with each slot having 14 OFDM symbols. Although only three slots are shown, this is only a partial view of a CG resource to focus on the disclosed details. It is to be understood that more or fewer slots may be included in each CG resource, depending on the implementation. In this example, S is not equal to 0, but set equal to mod (14,L). In this case, L=4 and so the value of S=2. In this particular scenario, as shown in the top row 402 of OFDM symbols illustrating configuration of slots, the first mini-slot PUSCH 446*a* is configured to begin at the third OFDM symbol (OS #2), the second mini-slot 446*b* is configured to begin at the seventh OFDM symbol (OS #6), and the third mini-slot 446*c* is configured to begin at the eleventh OFDM symbol (OS #10). This arrangement fills all the OFDM symbols of the first slot 410. As indicated above, in the second and subsequent slots 420, 430, S is set equal to 0 despite S=2 is indicated in the configuration information and the arrangement of mini-slot PUSCHs begins from the first OFDM symbol of the respective slot. In the second row 405 of OFDM symbols, it can be seen that the first two LBT procedures are unsuccessful and so there is no channel access as of the first two access occasions 447*a*, 447*b*. On the third access occasion 447*c* the LBT procedure is successful and a CG uplink transmission (PUSCH 1) occurs in the third mini-slot PUSCH 446*c*.

The second slot 420 has a similar scheduling configuration as the second slot 420 of in FIG. 4A and a similar transmission format of two mini-slot PUSCHs 448*a*, 448*b* of the same size for transmitting CG uplink transmissions (PUSCH 2 and PUSCH 3) and a single longer mini-slot PUSCH 448*c* for transmitting a CG uplink transmission (PUSCH 4). The third slot 430 and subsequent slots have a same arrangement for configuring and transmitting until releasing the CG uplink transmission resource.

FIG. 4C shows another alternative for a CG time resource 400 that is similar to FIG. 4A in that there are multiple same sized mini-slot PUSCHs and a single larger sized mini-slot PUSCH in a single slot. Although only three slots are shown, this is only a partial view of a CG resource to focus on the disclosed details. It is to be understood that more or fewer slots may be included in each CG resource, depending on the implementation. The difference is that in FIG. 4C the single larger sized mini-slot PUSCH is configured for beginning of the first slot, which as indicated above is referred to as Alt-2. FIG. 4C illustrates in the top row 402 of OFDM symbols a configuration with the single larger sized mini-slot PUSCH 456a configured to start at the first OFDM symbol (S=0) and then the two consecutive same sized mini-slot PUSCHs 456b, 456c having L OFDM symbols fill out the remainder of the 14 OFDM symbol slot. As shown in the bottom row 405, the first two LBT procedures at the first two access occasions 457a, 457b are unsuccessful, but the third LBT procedure at the third access occasion 457c is successful and so a first CG uplink transmission (PUSCH1) is transmitted on the third mini-slot 456c. In the second slot 420, CG uplink transmissions (PUSCH 2, PUSCH 3, and PUSCH 4 are transmitted in the mini-slot PUSCHs 458a, 458b, 458c. Subsequent slots 430 would have additional CG uplink transmissions in associated mini-slots.

FIG. 4D illustrates an embodiment for a CG time resource 400 having two full slots 410, 420 and a portion of a third slot 430 with each slot having 14 OFDM symbols. Although only three slots are shown, this is only a partial view of a CG resource to focus on the disclosed details. It is to be understood that more or fewer slots may be included in each CG resource, depending on the implementation. In this example, S is not equal to 0, but set equal to mod (14,L)+L. In this case, L=4 and so the value of S=6. In this particular scenario, as shown in the top row 402 of potential configuration, the first mini-slot PUSCH 466a is configured to begin at the seventh OFDM symbol (OS #6) and the second mini-slot PUSCH 466b is configured to begin at the eleventh OFDM symbol (OS #10). This arrangement fills all the OFDM symbols of the first slot 410. As indicated above, in the second and subsequent slots 420, 430, S is set equal to 0 and the arrangement of mini-slot PUSCHs begins from the first OFDM symbol of the respective slot. In the second row 405 of OFDM symbols, it can be seen that the first LBT procedure at the first access occasion 467a is unsuccessful and so there is no channel access as of the first access occasion 467a on mini-slot PUSCHs 466a. On the second access occasion 467b the LBT procedure is successful and a CG uplink transmission (PUSCH 1) occurs in the second mini-slot PUSCH 466b.

As can be seen from FIG. 4D, when S is set to a value that is not 0, a gap is introduced at the beginning of the slot. The network may take advantage of this type of flexibility to purposely create a gap before the start of the CG uplink transmission. The network may want to utilize such a gap for various reasons, one reason may be to allow the UE to perform LBT after the end of other DL or UL transmissions.

The second slot 420 has a similar configuration as the second slot 420 of in FIG. 4C and a similar transmission format of the single larger mini-slot PUSCH 468a transmitting a CG uplink transmission (PUSCH 2) and two mini-slot PUSCHs 468b, 468c of the same size having L OFDM symbols transmitting CG uplink transmissions (PUSCH 3 and PUSCH 4). The third slot 430 and subsequent slots have a same arrangement for configuration and transmitting until releasing the CG uplink transmission resource.

It should be noted that, in a more generalized form of the configurations in examples in FIG. 4B and FIG. 4D, S can be configured as $=\text{mod}(N_{symb},L)+m\,L$, where m=1, 2, ..., $$\left\lfloor \frac{N_{symb}}{L} \right\rfloor - 1,$$

whereas the number of configured consecutive mini-slot PUSCHs of length L in the first slot is configured as $$n = \left\lfloor \frac{N_{symb} - S}{L} \right\rfloor.$$

In order to notify the UE whether the larger sized mini-slot PUSCH with more OFDM symbols is configured at the beginning of the slot (Alt-1) is supported or the larger sized mini-slot is configured at the end of the slot (Alt-2) is supported, the network device may send some form of message. For example, an indication bit can be provided either in RRC messaging or in an activation DCI to indicate whether Alt-1 or Alt-2 is configured.

In some embodiments, in order to indicate whether a shorter mini-slot PUSCH or a longer mini-slot PUSCH is used in combination with the other same sized mini-slots having L OFDM symbols, the network device may send some form of message. For example, an indication bit can be provided either in RRC messaging or in an activation DCI to indicate whether a long or short mini-slot PUSCH is configured. In some embodiments, a two bit configuration message could be sent by the network device either in RRC messaging or in an activation DCI in which one bit indicates whether Alt-1 or Alt-2 is configured and the other bit indicates whether a long or short mini-slot PUSCH is configured.

Because two different OFDM sized PUSCHs may be used in the same configuration, the transport block size (TBS) can be maintained for both sized mini-slots or a different TBS can be used for the different OFDM sized PUSCHs. In order to maintain a same TBS size, a base station should indicate in RRC (for Type 1 or Type 2) or in DCI for Type 2, a lower MCS value to be used with the CG uplink transmission in the longer mini-slot PUSCH. Otherwise, if the same MCS level is used for all CG transmissions, the UE derives a larger TBS, e.g., from the mcsAndTBS parameter indicated in the configuration information, to be used only with the transmissions on the longer mini-slots.

In some embodiments, a network side device may configure the UE with a hybrid configuration. The hybrid configuration involves for a same active configuration duration, multiple mini-slot PUSCHs per slot for all CG time resource slots in which a UE attempts to access the channel. However, during transmission, once a UE has successfully accessed the channel in a slot, for subsequent CG time resource slots, if any, a default or pre-defined PUSCH resource allocation configuration is used. A particular example of a default or pre-defined PUSCH resource allocation configuration for second and subsequent transmission slots may involve using the full slot for a single CG PUSCH transmission. If a CG uplink transmission starts in slot m, the UE applies the default configuration to all remaining CG slots starting from slot m+1. A base station may start blind detection of the PUSCH demodulation reference signal (DMRS) of the CG UE in accordance with the default PUSCH configuration rather than the mini-slot PUSCH configuration starting from CG slot m+1.

In order to notify the UE that a hybrid configuration is to be used, the network device sends configuration information. For example, the configuration information may include an indication bit in RRC or an activation DCI to indicate that a hybrid configuration is to be used.

Before the UE attempts to access the configured transmission resource, the UE may follow a same procedure as described above for either Alt-1 or Alt-2 of the two embodiments described above, where one of the mini-slot PUSCHs has a fewer or larger number of OFDM symbols than the indicated L OFDM symbols for all CG time resource transmission slots. In some embodiments, a number of slots, for which the configurations in accordance with Alt-1 or Alt-2 of the two embodiments described above apply, is determined based on a maximum number of channel access attempts. A limitation on the maximum number of channel access attempts may be applicable when the CG time resource falls within a base station initiated channel occupancy time (COT) wherein the UE is indicated to switch from CAT2 LBT procedure instead of CAT4.

In some embodiments, a CG transmission, such as a PUSCH transmission, may only start at a configured PUSCH starting position.

In some embodiments, an additional parameter may be used to indicate a minimum number of OFDM symbols between two consecutive access occasions. The parameter may be used to limit a number of channel access attempts. In a particular example, when L=2, channel access occasions may be limited, via the additional parameter, to occur every 4 OFDM symbols, which is at the start of every other PUSCH.

Figure 5A:
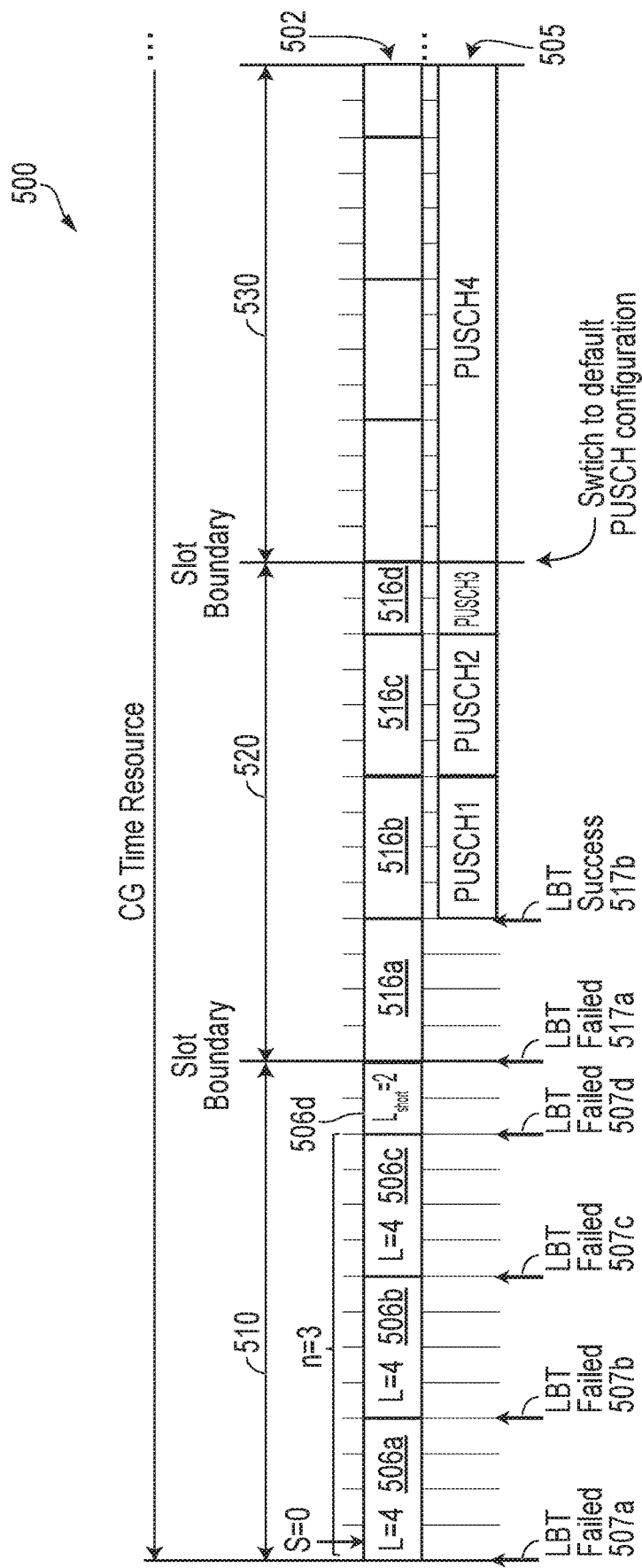
FIGS. 5A, 5B, 5C, 5D and 5E are example representations of CG resource allocation and transmission according to a third embodiment of the present application.

FIG. 5A illustrates a transmission resource to be used for a CG time resource 500 that includes three full slots 510, 520, 530. Although only three slots are shown, this is only a partial view of a CG resource to focus on the disclosed details. It is to be understood that more or fewer slots may be included in each CG resource, depending on the implementation. Each slot includes 14 OFDM symbols. The configuration of the first slot 510 is similar to the first slot 310 of FIG. 3A in that there are three same sized mini-slot PUSCHs 506a, 506b, 506c and a single smaller sized mini-slot PUSCH 506d. FIG. 5A illustrates in a top row 502 a configuration for each slot and in a bottom row 505 resulting CG uplink transmissions once there is successful channel access. In the first slot 510, LBT procedures are unsuccessful at all four access occasions 507a, 507b, 507c, 507d and therefore the configured mini-slot PUSCHs 506a, 506b, 506c, 506d of the first slot 510 are not transmitted. In the second slot 520, an LBT procedure is unsuccessful at the first access occasion 517a and no CG uplink transmission is transmitted in the first mini-slot PUSCH 516a. An LBT procedure is successful at the second access occasion 517b, and therefore the second configured mini-slot PUSCH 516b is used for the CG uplink transmission (PUSCH 1). Because the channel has been successfully accessed, the remainder of the configured mini-slot PUSCHs 516c, 516d in the second slot 520 can be used to transmit CG transmissions (PUSCH 2, PUSCH 3). After successfully accessing the CG time resource 500 in the second slot 520, the configuration can be switched to the default or pre-defined PUSCH resource allocation configuration in the third slot 530 and any subsequent slots, if any. In the particular example of FIG. 5A, the default PUSCH resource allocation configuration is that the entirety of the third slot 530 is used for a single CG transmission (PUSCH 4). In some embodiments, the hybrid configuration information may include a reference to a previous CG configuration, e.g., a configuration ID, for the UE to use its relevant parameters, e.g., SLIV and mcsAndTBS, as the default configuration parameters. In some other embodiments, such default configuration parameters are included in the hybrid configuration information itself.

The hybrid configuration exploits a fine granularity of mini-slots for increased channel access probability while minimizing the associated overhead and complexity issues or the special handling in transmitting repetitions or HARQ retransmissions.

Using Alt-2, i.e. the short or long mini-slot PUSCH configured for the start of the first slot, with the hybrid configuration reduces the likelihood of transmitting CG uplink transmission using the short or long mini-slot PUSCH at the beginning of the first transmission slot, because there is a higher probability that the LBT procedure will be unsuccessful at the first access occasion of the first transmission slot than the last access occasion of the first transmission slot.

FIGS. 5B, 5C, 5D and 5E are further examples of different embodiments of the hybrid configuration for scheduling a shorter and a longer single mini-slot PUSCH in combination with multiple same sized mini-slot PUSCHs having L OFDM symbols in which the first mini-slot PUSCH is configured to start at the first OFDM symbol (S=0) or at an alternative OFDM symbol in the first slot in which a mini-slot PUSCH is successfully accessed. Although only three slots are shown in each of the examples, this is only a partial view of a CG resource to focus on the disclosed details. It is to be understood that more or fewer slots may be included in each CG resource, depending on the implementation.

Figure 5B:
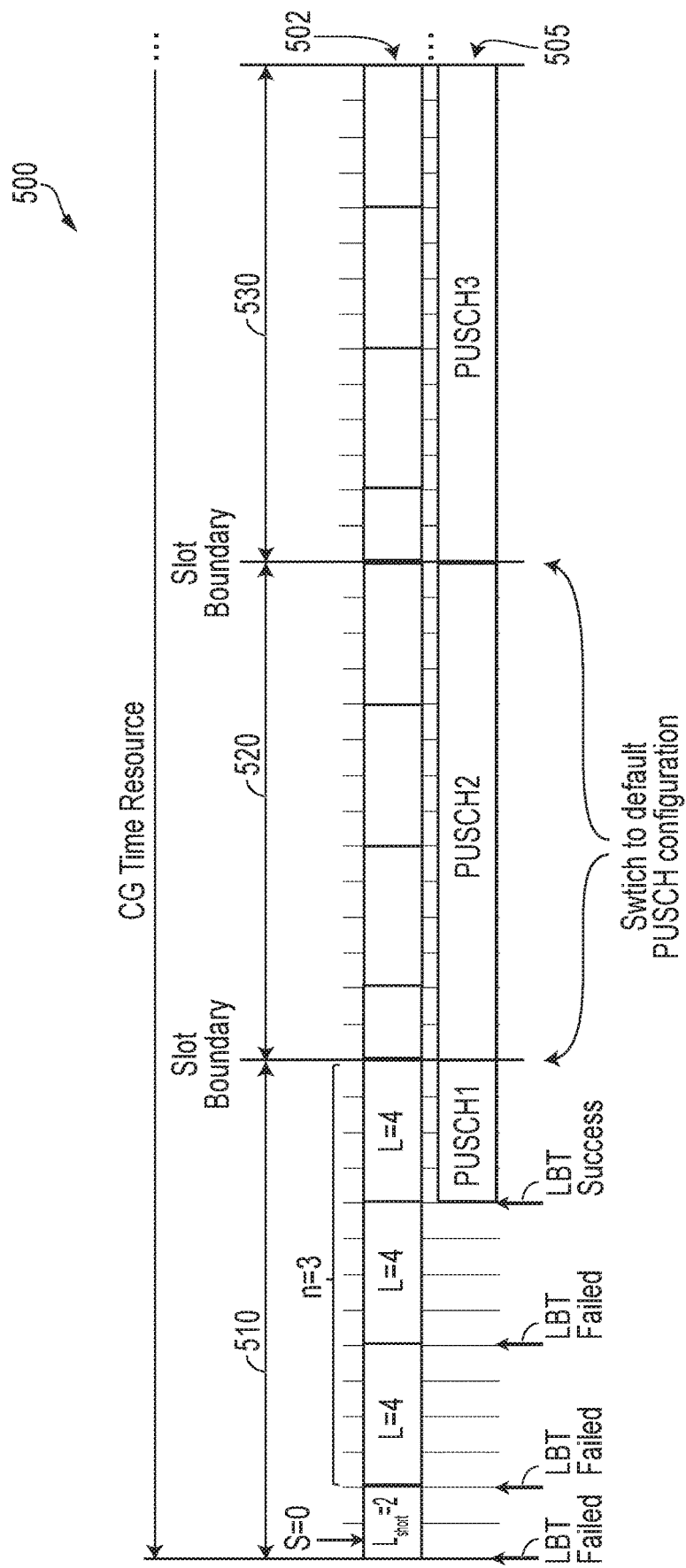

In FIG. 5B, a shorter single mini-slot PUSCH is configured to start at a first OFDM symbol (S=0) of a slot and thus the configuration shown in the top row 502 of OFDM symbols appears similar to those shown in the top row 302 of FIG. 3C. As shown in the bottom row 505 of OFDM symbols, in the first slot 510, the first three LBT procedures are unsuccessful at the first three access occasions. The fourth LBT procedure is successful at the fourth access occasion and a CG uplink transmission (PUSCH1) occurs. Because this embodiment uses the hybrid configuration, the second and subsequent slots 520, 530 in FIG. 5B use a default PUSCH resource allocation configuration, for example using the full slot for each subsequent CG uplink transmission (PUSCH 2, PUSCH 3) until the channel is released. As such, the shorter mini-slot PUSCH is not transmitted unless the channel is successfully accessed at the first occasion of a slot within the duration of the CG time resource.

Figure 5C:
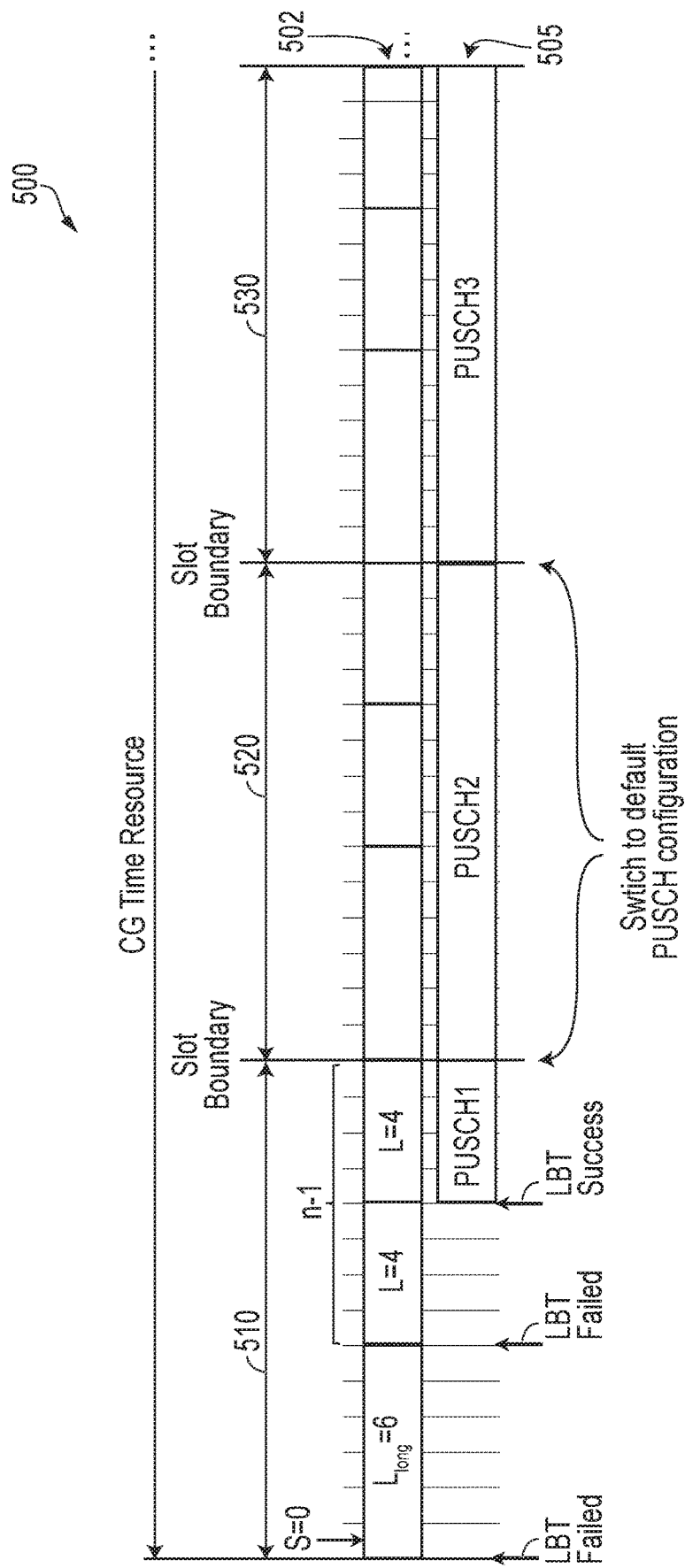

In FIG. 5C, a longer single mini-slot PUSCH is configured to start at a first OFDM symbol (S=0) of a slot and thus the configuration shown in the top row 502 of OFDM symbols appears similar to those shown in the top row 402 of FIG. 4C. As shown in the bottom row 505 of OFDM symbols, in the first slot 510, the first two LBT procedures are unsuccessful at the first two access occasions. The third LBT procedure is successful at the third access occasion and a CG uplink transmission (PUSCH1) occurs. As this embodiment uses the hybrid configuration, the second and subsequent slots 520, 530 in FIG. 5C use a default PUSCH resource allocation configuration, for example using the full slot for each subsequent CG uplink transmission (PUSCH 2, PUSCH 3) until the channel is released. As such, the longer mini-slot PUSCH is not transmitted unless the channel is successfully accessed at the first occasion of a slot within the duration of the CG time resource.

Figure 5D:
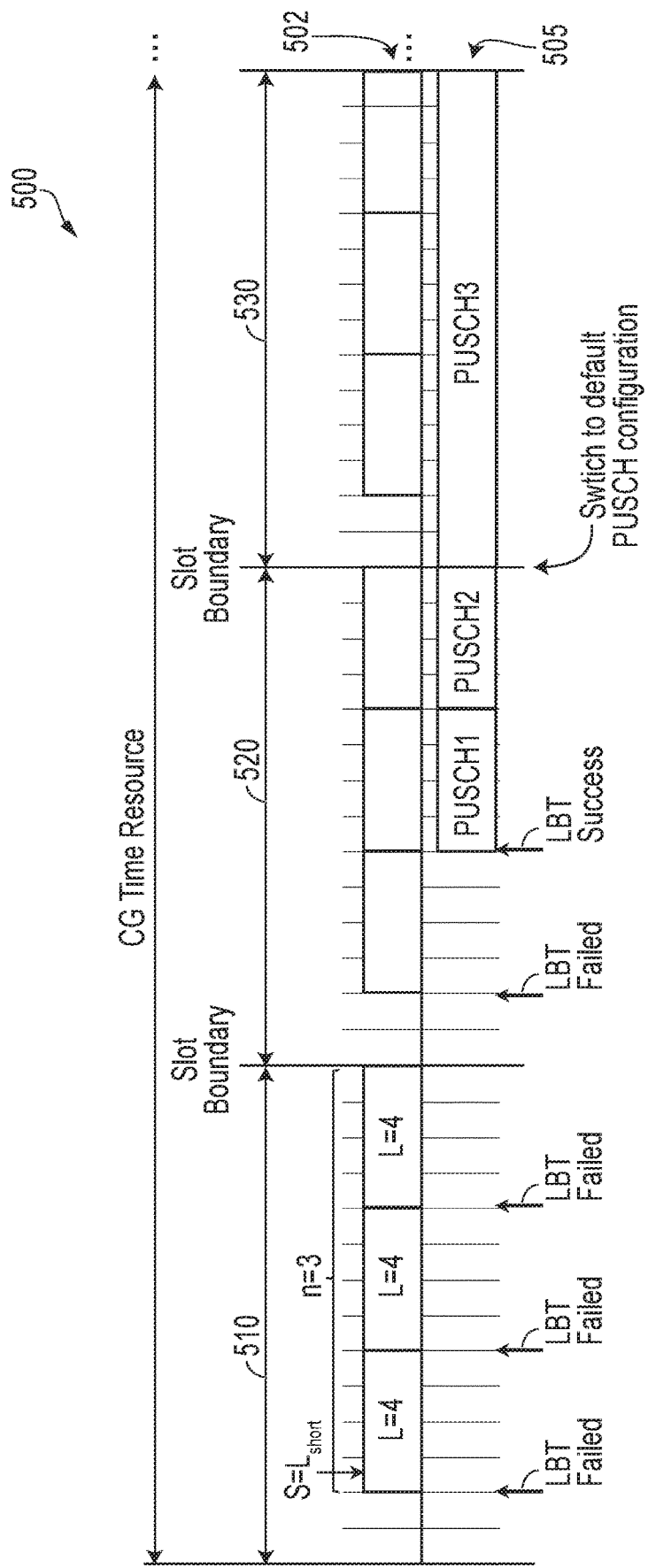

In FIG. 5D, a mini-slot is configured to start at an OFDM symbol other than the first OFDM symbol (S≠0) of a slot. In the example of FIG. 5D, S is equal to mod (14,L), in which L=4 and the resulting value of S=2. S is denoted equal to $L_{short}$ in FIG. 5D. For the first slot 510 of FIG. 5D, the configuration shown in the top row 502 of OFDM symbols appears similar to the first slot 310 shown in the top row 302 of FIG. 3B. In the hybrid configuration, because second and subsequent slots after a first slot in which CG uplink transmissions have a default PUSCH resource allocation configuration, each of the slots is configured to act as a first slot in which a CG uplink transmission may occur, i.e., the same combination of start symbol and length of the consecutive mini-slot PUSCHs repeats over the consecutively allocated slots. As can be seen in FIG. 5D, in the bottom row 505, in the first slot 510, all three LBT procedures are unsuccessful at the first three access occasions. Because each of the slots is configured like the first slot 510, the second slot 520 now has multiple mini-slot PUSCHs with the first one to start at S=2, i.e. the third OFDM symbol. The first LBT procedure at the first access occasion of the second slot 520 is unsuccessful. The second LBT procedure is successful at the second access occasion and a CG uplink transmission (PUSCH1) occurs. A second CG uplink transmission (PUSCH 2) occurs at the second mini-slot PUSCH of the second slot 520. Because this embodiment uses the hybrid configuration, even though the third and subsequent slots 530 in FIG. 5D are configured to start at the third OFDM symbol, because the UE may switch to a default PUSCH resource allocation configuration, they may actually start on the first OFDM symbol. The default configuration in FIG. 5D is, for example, using the full slot for each subsequent CG uplink transmission (PUSCH 3) until the channel is released.

Figure 5E:
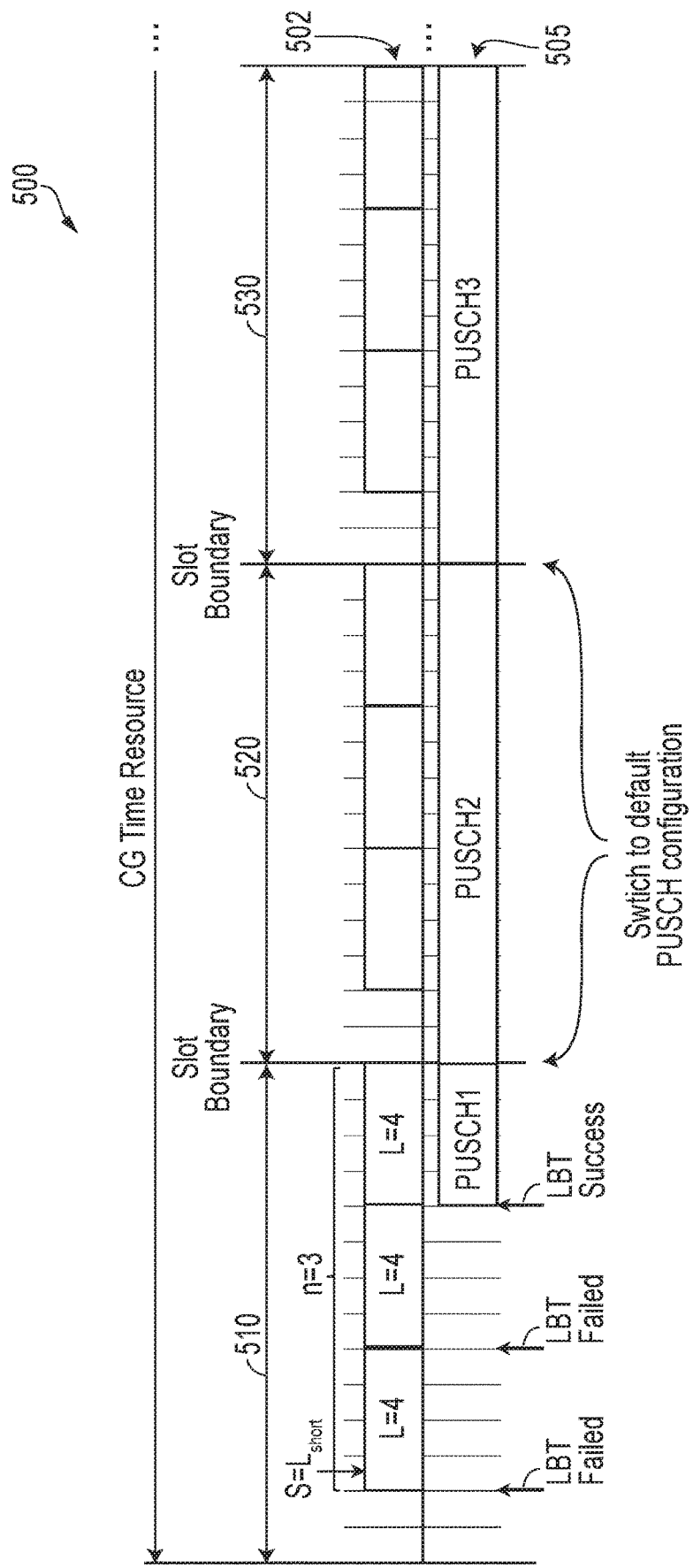

In FIG. 5E, a mini-slot PUSCH is configured to start at an OFDM symbol other than the first OFDM symbol (S≠0) of a slot. In the example of FIG. 5E, S once again equal 2 and the same combination of start symbol and length of the consecutive mini-slot PUSCHs repeats over the consecutively allocated slots. As can be seen in FIG. 5E, in the bottom row 505 of OFDM symbols, in the first slot 510, the first two LBT procedures are unsuccessful at the first two access occasions. The third LBT procedure at the third access occasion is successful and a CG uplink transmission (PUSCH1) occurs. Because this embodiment uses the hybrid configuration, the second and subsequent slots 520, 530 in FIG. 5E may use a default PUSCH resource allocation configuration, for example using the full slot for each subsequent CG uplink transmission (PUSCH 2, PUSCH 3) until the channel is released.

Using Alt-2, i.e. the short or long mini-slot PUSCH configured for the start of the first slot, with the hybrid configuration while indicating S=mod($N_{symb}$,L) eliminates the need for transmitting CG uplink transmission using the short or long mini-slot PUSCH at the beginning of the first transmission slot regardless of LBT results. This observation holds true for the more general case of indicating S as S=mod($N_{symb}$, L)+m L, where m=0,1, . . . , $$\left\lfloor \frac{N_{symb}}{L} \right\rfloor - 1.$$

This is because the remaining number of symbols in that slot $N_{symb}$–S is always evenly divisible by L. Whereas the subsequent slots revert to the default PUSCH resource allocation configuration as shown in the examples of FIG. 5D and FIG. 5E.

The hybrid configuration can be also achieved using multiple offsets per active CG configuration. A first offset is associated with a first CG transmission duration ($D_1$) in which the multiple mini-slot PUSCHs are configured per slot as in either of Alt-1 or Alt-2. A second (larger) offset is associated with a second CG transmission duration ($D_2$) in which the default PUSCH resource allocation configuration is applied.

The offsets could be set such that the slots of $D_1$ and $D_2$ are contiguous in time or overlapping in time. In the overlapping case, after the UE acquires a channel and starts transmitting in one of the overlapping slots or in the slot immediately preceding them, the UE can start applying the default PUSCH resource allocation configuration in the next slot.

The hybrid configuration can be also achieved using multiple active CG configurations instead of a same active CG configuration. A first active configuration is associated with a first set of time-domain resource configuration parameters comprising a first periodicity, a first offset and a first CG time resource ($D_1$) in which the multiple mini-slot PUSCHs are configured per slot as in either of Alt-1 or Alt-2. A second active configuration is associated with a second set of time-domain resource configuration parameters comprising a second periodicity, a second offset, and a second CG time resource ($D_2$) in which the default PUSCH resource allocation configuration is applied. The two configurations target the same CG time resource by matching the values of the first and the second periodicity, offset, and CG time resource parameters, respectively. After the UE accesses a channel and starts transmitting in one of the slots in that same CG time resource, the UE can apply the second active configuration, including the second PUSCH resource allocation configuration, starting from the next slot. In some cases, if the first and second active CG configurations share the same access occasion of the first slot of the CG time resource, and the UE successfully accesses the channel at that access occasion, the UE only applies the second active configuration, including the second PUSCH resource allocation configuration, to all the slots of the CG time resource.

There are additional embodiments described below that enable configuration of mini-slots in a slot or indicating that multiple mini-slot PUSCHs occur within the slot. For example, if a granularity of two OFDM symbols or seven OFDM symbols is deemed sufficient (for $N_{symbol}$=14), and it is desirable to create a non-uniform allocation pattern within a CG resource duration per offset, a bitmap of length of D bits can be used in RRC or activation DCI such that each bit in the bit map corresponds to L OFDM symbols as indicated in SLIV, which denotes the mini-slot PUSCH length and the bitmap size D=n*NumberOfTransmissionSlotsPer Offset. One or more '0' can be indicated in the bit map to create a desired gap duration within the CG time resource based on the sub-carrier spacing (SCS) in use. Such an embodiment allows partial slots to be allocated as well.

If either Alt-1 or Alt-2 is used as described in the examples above in which a short or long mini-slot PUSCH is used together with multiple same sized mini-slot PUSCHs having L OFDM symbols, a different transport block size (TBS) is used for transmissions on the short or long mini-slot PUSCHs. The following are possible options.

In some embodiments, HARQ retransmissions of a transport block (TB) initially transmitted on a short or long mini-slot PUSCH can only be transmitted on similar occurrences of the short or long mini-slot PUSCH within the same period or within subsequent periods according to the criteria of retransmission on CG resources.

Figure 6A:
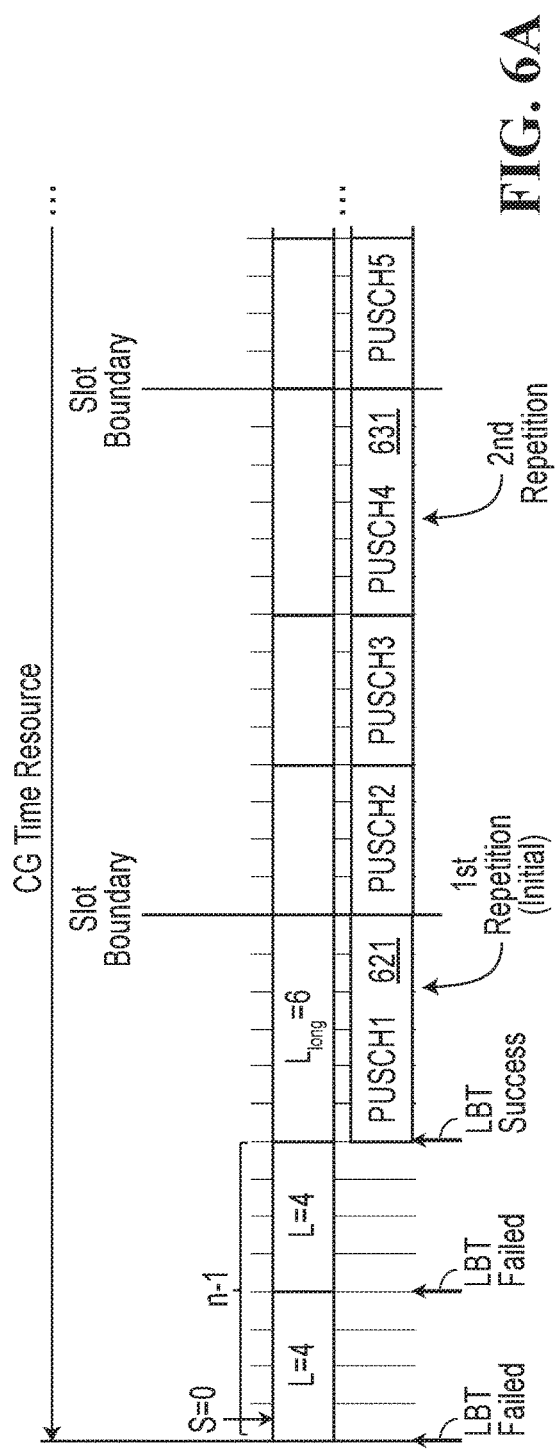
FIGS. 6A and 6B are example representations of CG resource allocation and transmission according to a fourth embodiment of the present application.

FIG. 6A illustrates an example of a configuration for single longer mini-slot PUSCH at the end of a first slot (Alt-1), where S=0 and the first two LBT procedures at the first two access occasions are unsuccessful, but the third LBT procedure is successful. FIG. 6A has a similar arrangement of mini-slot PUSCHs and successful access as FIG. 4A. Because the mini-slot PUSCHs 621, 631 on which CG uplink transmissions (PUSCH 1 and PUSCH 4) occur are of the same size, these repeating sized mini-slot PUSCHs 621,631 can be used for a first repetition (initial transmission) and a second repetition, and possibly more if needed, while the channel is still available.

Figure 6B:
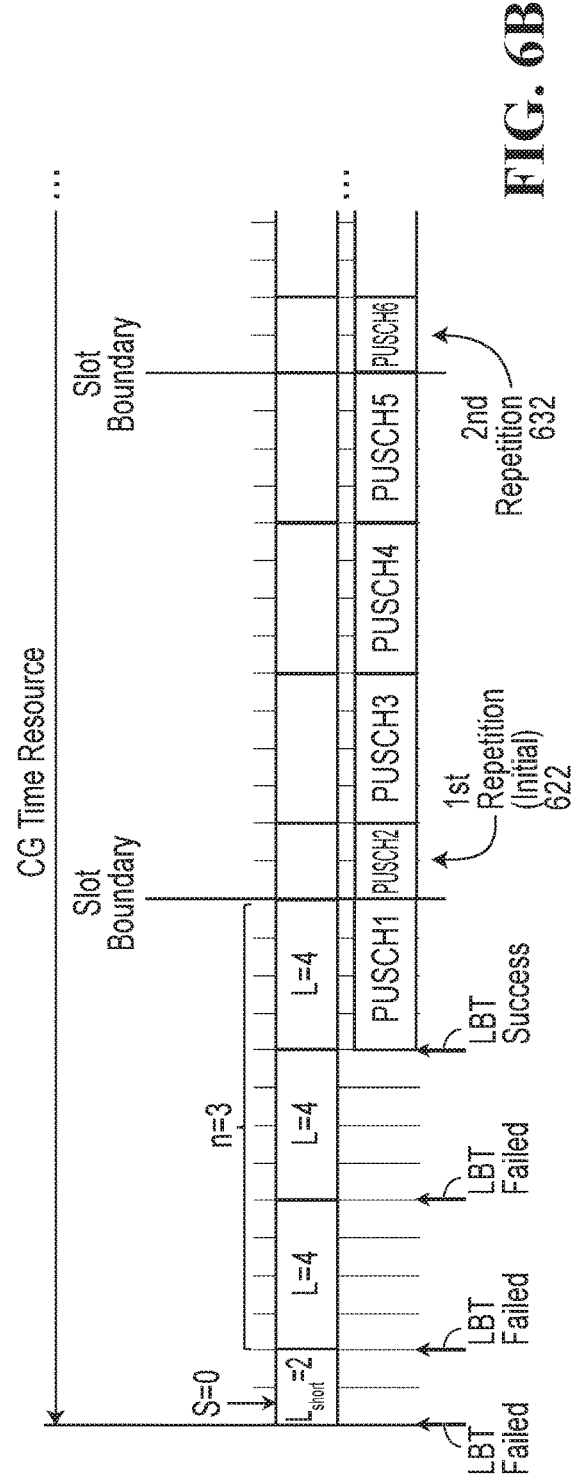

FIG. 6B illustrates an example of a single shorter mini-slot PUSCH at the beginning of a first slot (Alt-2), where S=0 and the first three LBT procedures at the first three access occasions are unsuccessful, but the fourth LBT procedure is successful. FIG. 6B has a similar arrangement of mini-slot PUSCHs and successful access as FIG. 3C. Because the mini-slot PUSCHs 622, 632 on which the CG uplink transmissions (PUSCH 2 and PUSCH 6) occur are of the same size, these repeating sized mini-slot PUSCHs 622, 632 can be used for a first repetition (initial transmission) and a second repetition, and possibly more if needed, while the channel is still available.

In some embodiments, HARQ retransmissions of a transport block (TB) initially transmitted using a short or long mini-slot PUSCH can be limited only to scheduled (grant based) retransmissions on dedicated resources In some embodiments, K-repetitions (K>1) of a TB initially transmitted on a short or long mini-slot PUSCH can be supported only on non-consecutive resources, i.e., similar occurrences of the short or long mini-slot PUSCH of consecutive CG slots within the same period or continued in a subsequent period.

In some embodiments, K>1 may not be allowed for such initial transmissions, e.g., the smaller TBS used with short mini-slot PUSCH could be small enough to benefit from the coding gain when transmitted on a larger size PUSCH. Otherwise, if the same TBS is assumed for all configured PUSCHs, the UE follows the normal procedure for HARQ retransmissions on CG resources.

The UE may first select the earliest available consecutive CG PUSCH resources, from the transmission of the initial transmission, within the same slot or same period to transmit some or all of the K repetitions indicated. Remaining repetitions, if any, are then transmitted in non-consecutive resources. For low latency applications, such remaining repetitions could be dropped If a hybrid configuration is used, HARQ retransmissions of a TB initially transmitted on a mini-slot CG uplink transmission within the first slot using a different TBS may be limited to scheduled (grant based) retransmissions on dedicated resources, especially when Alt-2 is used in the first slot.

An actual number of repetitions (for K>1) may be limited by the number of actual transmitted CG uplink transmissions using mini-slot PUSCHs of length L (at most n) for a TB initially transmitted in the 1$^{st}$ CG slot for which multiple mini-slot PUSCHs are used.

Figure 7:
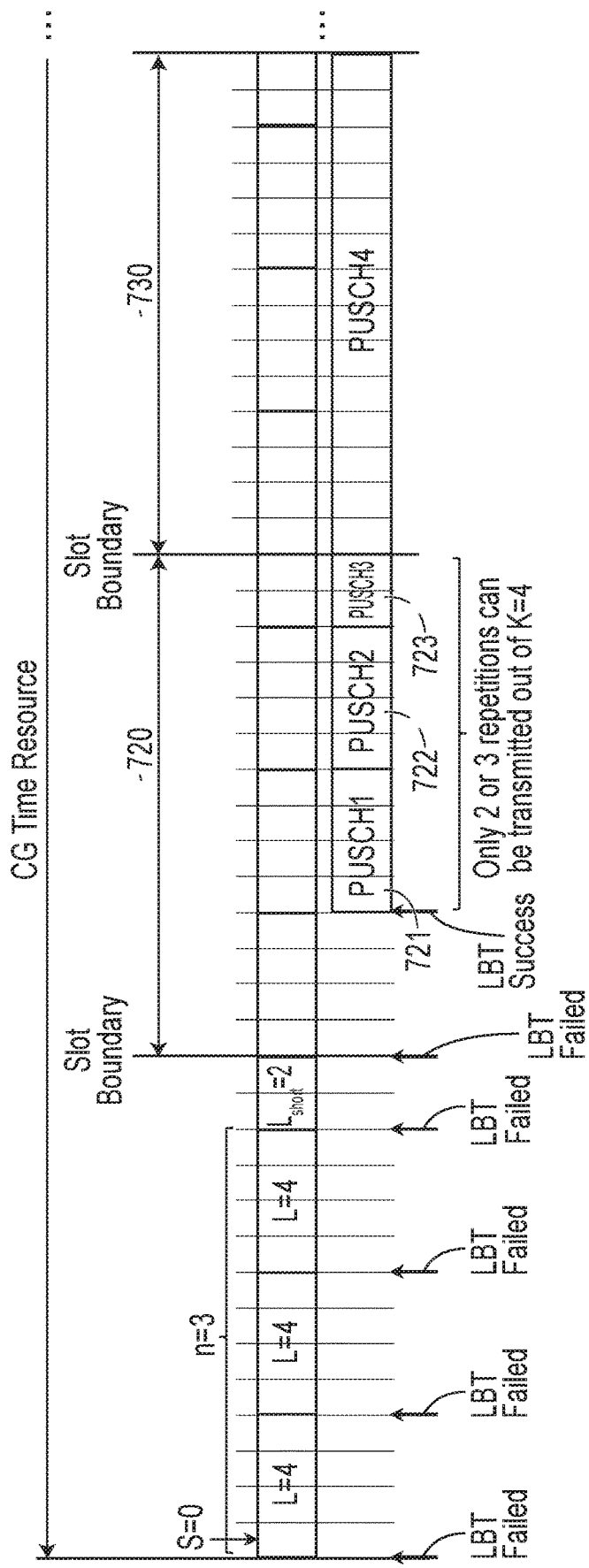
FIG. 7 is an example representation of CG resource allocation and transmission according to a fifth embodiment of the present application.

FIG. 7 illustrates an example of a hybrid configuration with a single shorter mini-slot PUSCH configured at the end of a slot (Alt-1), where S=0 and the first five LBT procedures at the first five access occasions are unsuccessful, but the sixth LBT procedure, into the second slot, is successful. FIG. 7 has a similar arrangement of mini-slot PUSCHs and hybrid configuration and as FIG. 5A. In the particular example of FIG. 7, because slots subsequent to the first slot that have successful CG uplink transmissions use a default full slot for CG uplink transmissions, only three mini-slot PUSCHs 721, 722, 723 occurring in slot 720, before the full slot 730 CG uplink transmission, can be used for repetitions. The first two mini-slot PUSCHs 721, 722, and possibly the third mini-slot PUSCH 723, the shorter mini-slot PUSCH, could be used for a first repetition (initial transmission), a second repetition, and possibly a third repetition depending on whether the same TBS can be used for all mini-slot PUSCHs and whether the shorter mini-slot PUSCH is used for data transmission or other uplink information or signals.

In some embodiments, repetitions may not be supported for a TB initially transmitted on a short mini-slot CG uplink transmission. This is due to the fact that re-occurrence of the similar resources or that particular transport block size (TBS) is not guaranteed in subsequent slots.

Figure 8:
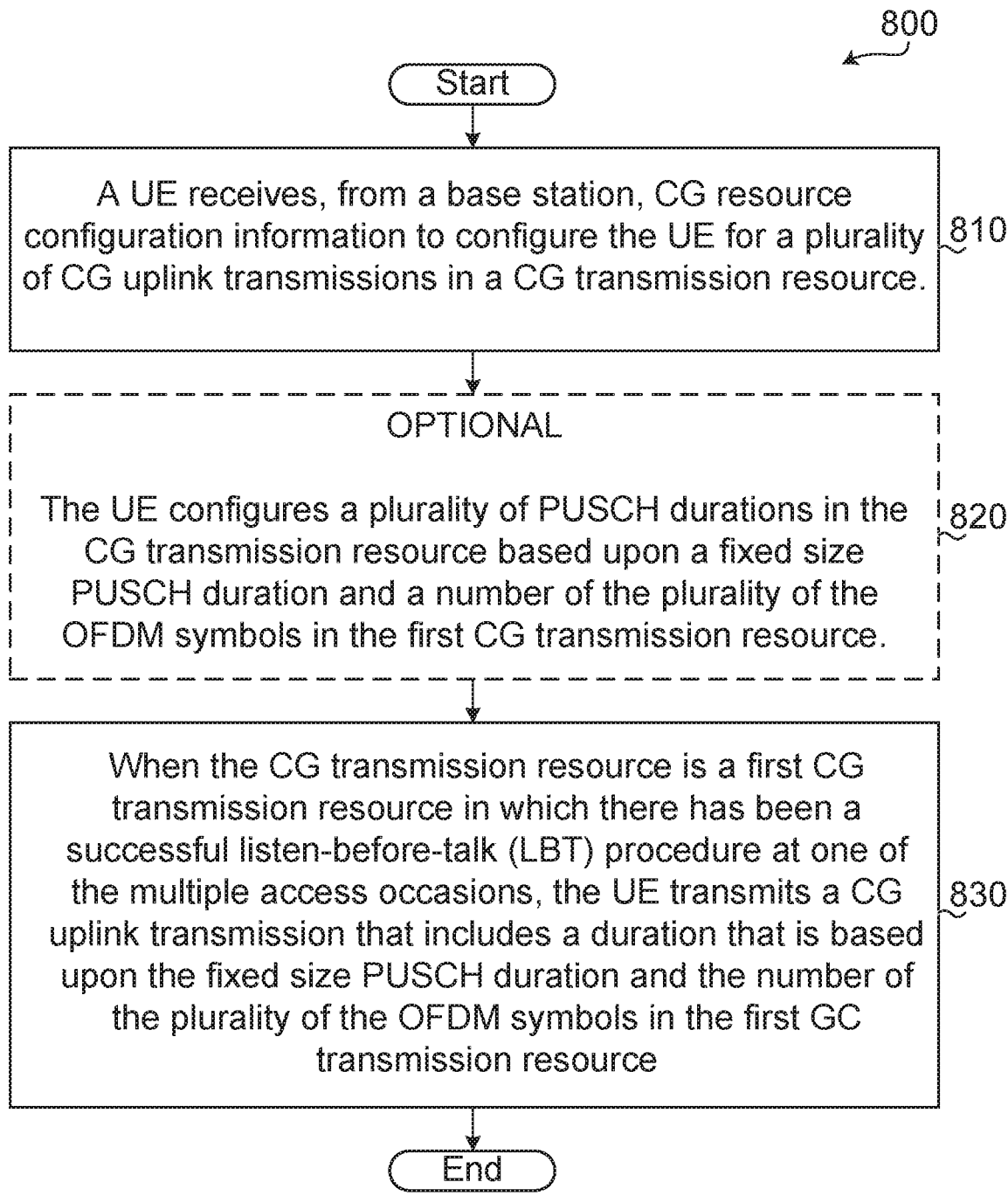
FIG. 8 is a flow diagram of example operations in a user equipment (UE) in accordance with an embodiment of the present disclosure.

FIG. 8 is a flow diagram of example operations 800 performed in a user equipment (UE) in accordance with an embodiment of the present disclosure.

In step 810, the UE receives, from a base station, CG resource configuration information to configure the UE for a plurality of CG uplink transmissions in a CG transmission resource. The CG transmission resource may, for example, be a slot. The CG transmission resource includes a plurality of PUSCH durations and each PUSCH duration includes a plurality of OFDM symbols. The PUSCH duration may be a mini-slot as described in the embodiments above in FIGS. 3A to 3D, 4A to 4D, 5A to 5E, 6A, 6B and 7. The CG resource configuration information includes an indication of a fixed size PUSCH duration within the CG transmission resource. The CG resource configuration information is used to configure multiple access occasions for the UE to start a CG uplink transmission within the CG transmission resource.

In step 820, which may be considered optional, the UE configures a plurality of PUSCH durations in the CG transmission resource based upon the fixed size PUSCH duration and the number of the plurality of the OFDM symbols in the first CG transmission resource.

In step 830, when the CG transmission resource is a first CG transmission resource in which there has been a successful listen-before-talk (LBT) procedure at one of the multiple access occasions, the UE transmits a CG uplink transmission that includes a duration that is based upon the fixed size PUSCH duration and a number of the plurality of the OFDM symbols in the first CG transmission resource.

The example operations 800 are illustrative of an example embodiment. Various ways to perform the illustrated operations, as well as examples of other operations that may be performed, are described herein. Further variations may be or become apparent.

Figure 9:
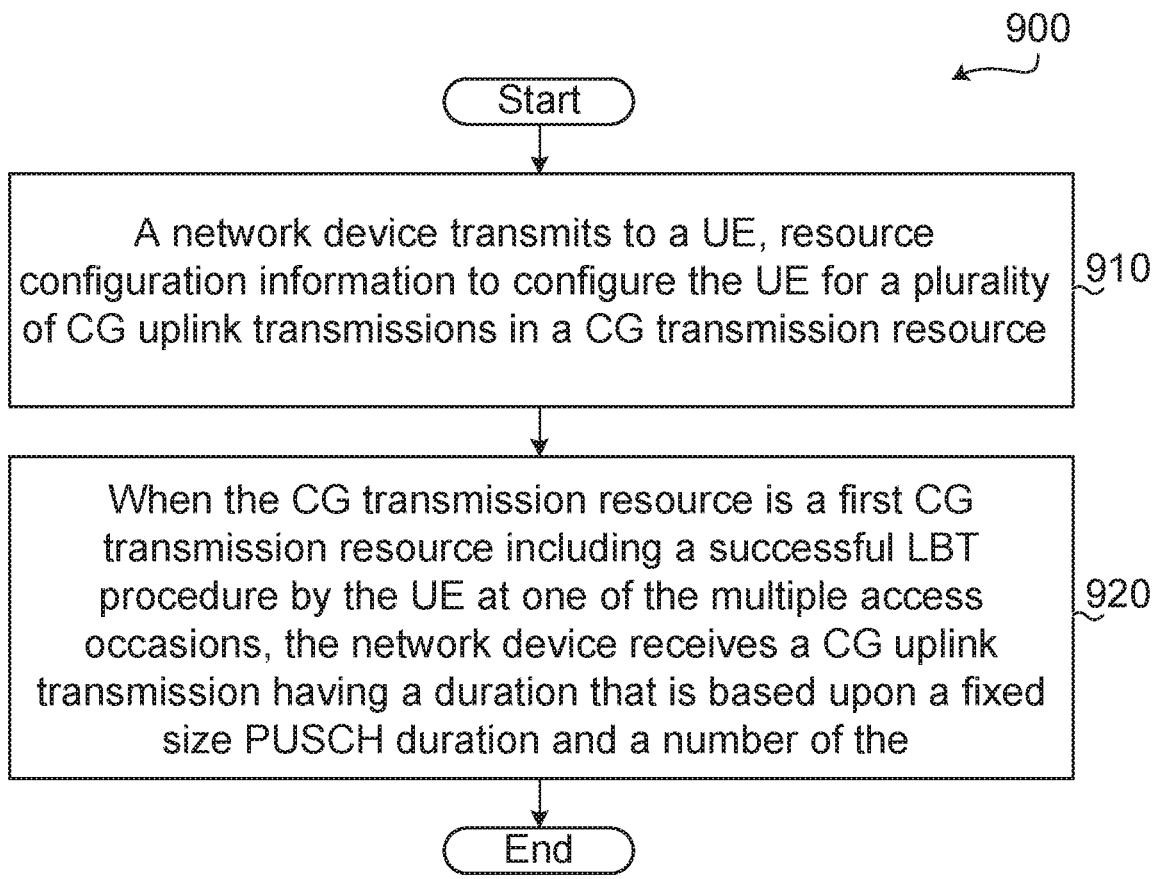
FIG. 9 is a flow diagram of examples operations in a network device in accordance with an embodiment of the present disclosure.

FIG. 9 is a flow diagram of example operations 900 performed in a network side device for using configured grant in unlicensed spectrum in accordance with an embodiment of the present disclosure.

In step 910, the network device transmits to a UE, resource configuration information to configure the UE for a plurality of CG uplink transmissions in a CG transmission resource. The CG transmission resource includes a plurality of PUSCH durations and each PUSCH duration includes a plurality of OFDM symbols. The CG resource configuration information includes an indication of a fixed size PUSCH duration within the CG transmission resource. The CG resource configuration information is used to configure multiple access occasions for the UE to start a CG uplink transmission within the CG transmission resource.

In step 920, when the CG transmission resource is a first CG transmission resource including a successful LBT procedure by the UE at one of the multiple access occasions, the network device receives a CG uplink transmission having a duration that is based upon the fixed size PUSCH duration and a number of the plurality of the OFDM symbols in the first CG transmission resource.

The example operations 900 are illustrative of an example embodiment. Various ways to perform the illustrated operations, as well as examples of other operations that may be performed, are described herein. Further variations may be or become apparent.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or in part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR and LTE terminology. However, the embodiments disclosed herein are not in any way limited to NR or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

In a first example of the present application, there is provided a method for a user equipment (UE) using configured grant in unlicensed spectrum. The method involves receiving, at the UE from a network device, configured grant (CG) resource configuration information to configure the UE for a plurality of CG uplink transmissions in a CG transmission resource. The CG transmission resource includes a plurality of PUSCH durations and each PUSCH duration includes a plurality of orthogonal frequency division multiplexed (OFDM) symbols. The CG resource configuration information includes an indication of a fixed size PUSCH duration within the CG transmission resource. The CG resource configuration information is used to configure multiple access occasions for the UE to start a CG uplink transmission within the CG transmission resource. When the CG transmission resource is a first CG transmission resource including a successful listen-before-talk (LBT) procedure at one of the multiple access occasions, the method includes transmitting a CG uplink transmission having a duration that is based upon the fixed size PUSCH duration and a number of the plurality of the OFDM symbols in the first CG transmission resource.

In some embodiments related to the first example, the method further includes configuring a plurality of PUSCH durations in the CG transmission resource based upon the fixed size PUSCH duration and the number of the plurality of the OFDM symbols in the first CG transmission resource.

In some embodiments related to the first example, configuring the plurality of PUSCH durations comprises at least one of: configuring at least one PUSCH duration that is equal to the fixed size PUSCH duration; configuring at least one PUSCH duration that is equal to the fixed size PUSCH duration and a PUSCH duration that is less than the fixed size PUSCH duration; and configuring at least one PUSCH duration that is equal to the fixed size PUSCH duration and a PUSCH duration that is greater than the fixed size PUSCH duration.

In some embodiments related to the first example, transmitting a CG uplink transmission having a duration that is based upon the fixed size PUSCH duration and the number of the plurality of the OFDM symbols in the first CG transmission resource including a successful LBT procedure comprises at least one of: transmitting at least one first CG uplink transmission, each first CG uplink transmission in a PUSCH duration equal to the fixed size PUSCH duration; transmitting a second CG uplink transmission in a PUSCH duration that is less than the fixed size PUSCH duration; transmitting a third CG uplink transmission in a PUSCH duration that is greater than the fixed size PUSCH duration;

transmitting at least one first CG uplink transmission in a PUSCH duration that is equal to the fixed size PUSCH duration and a second CG uplink transmission in a PUSCH duration that is less than the fixed size PUSCH duration; and transmitting at least one first CG uplink transmission in a PUSCH duration that is equal to the fixed size PUSCH duration and a third CG uplink transmission in a PUSCH duration that is greater than the fixed size PUSCH duration.

In some embodiments related to the first example, the CG uplink transmission in a PUSCH duration that is less than the fixed size PUSCH duration is located in a first PUSCH duration or a last PUSCH duration in the first CG transmission resource.

In some embodiments related to the first example, the CG uplink transmission in a PUSCH duration that is greater than the fixed size TB duration is located in a first PUSCH duration or a last PUSCH duration in the first CG transmission resource.

In some embodiments related to the first example, the method further includes the UE receiving an indication that: a PUSCH duration that is greater than the fixed size PUSCH duration or a PUSCH duration that is less than the fixed size PUSCH duration is a first PUSCH duration in the first CG transmission resource; or a PUSCH duration that is greater than the fixed size PUSCH duration or a PUSCH duration that is less than the fixed size PUSCH duration is the last PUSCH duration in the first CG transmission resource.

In some embodiments related to the first example, the method further includes the UE receiving an indication that: one of the PUSCH durations is greater than the fixed size PUSCH duration; or one of the PUSCH durations is less than the fixed size PUSCH duration.

In some embodiments related to the first example, the method further includes receiving an indication of a starting OFDM symbol in the CG transmission resource, the indication indicating a starting OFDM symbol for a first CG uplink transmission in a first PUSCH duration.

In some embodiments related to the first example, if S is not equal to 0, applying the value of S to: only a first CG transmission resource of a plurality of configured CG transmission resources; or only a first CG transmission resource in which a LBT procedure has been successful to access the first CG transmission resource.

In some embodiments related to the first example, when configuring a plurality of PUSCH durations in the CG transmission resource, the starting OFDM symbol is one of: a first OFDM symbol in the CG transmission resource; an OFDM symbol in the CG transmission resource defined by mod ($N_{symbols}$, L), wherein $N_{symbols}$ is equal to the number of OFDM symbols in the first period and L is the number of OFDM symbols defined in the CG uplink transmission time domain resource duration; and the OFDM symbol in the CG transmission resource defined by m*L+mod ($N_{symbols}$, L), where m=0, 1, to n−1.

In some embodiments related to the first example, the method further includes, in a second and subsequent CG transmission resource, configuring a PUSCH duration in a same configuration as the first CG transmission resource.

In some embodiments related to the first example, the method further includes, in a second and subsequent CG transmission resource, when S is not equal to 0, configuring a PUSCH duration in a pre-defined configuration that is different than the configuration of the first CG transmission resource.

In some embodiments related to the first example, when transmitting a plurality of CG uplink transmissions in respective PUSCH durations in the CG transmission resource, the starting OFDM symbol is one of: a first OFDM symbol in the CG transmission resource including a successful LBT procedure; an OFDM symbol in the CG transmission resource including a successful LBT procedure defined by mod ($N_{symbols}$, L), wherein $N_{symbols}$ is equal to the number of OFDM symbols in the first period and L is the number of OFDM symbols defined in the CG uplink transmission time domain resource duration; and the OFDM symbol in the CG transmission resource including a successful LBT procedure defined by m*L+mod ($N_{symbols}$, L), where m=0, 1, to n−1.

In some embodiments related to the first example, the method further includes, in a second and subsequent CG transmission resource after a successful CG uplink transmission in a first CG transmission resource, transmitting CG uplink transmissions in a pre-defined configuration that is different than the configuration of the first CG transmission resource.

In some embodiments related to the first example, the pre-defined configuration that is different than the configuration of the first CG transmission resource comprises a single CG uplink transmission in a single PUSCH duration occupying an entire period.

In some embodiments related to the first example, the method further includes, in a second and subsequent CG transmission resource after a successful CG uplink transmission in a first CG transmission resource, transmitting CG uplink transmissions in a same configuration as the configuration of the first CG transmission resource.

In some embodiments related to the first example, the fixed size TB block duration is defined in part by a TB block duration that is less than the duration of the fixed size TB block duration having to be greater than or equal to a minimum number of OFDM symbols.

In some embodiments related to the first example, the fixed size TB block duration is defined in part by the fixed size TB block having to be greater than or equal to a minimum number of OFDM symbols.

In some embodiments related to the first example, the method further includes receiving a higher modulation and coding scheme (MCS) value for transmitting the CG uplink transmission that is less than the fixed size PUSCH duration.

In some embodiments related to the first example, the method further includes receiving a lower MCS value for transmitting the CG uplink transmission that is greater than the fixed size duration.

In some embodiments related to the first example, the method further includes receiving a single MCS value for transmitting CG uplink transmissions in a fixed size PUSCH duration, a PUSCH duration that is less than the fixed size PUSCH duration or a PUSCH duration that is greater than the fixed size PUSCH duration.

In some embodiments related to the first example, the method further includes receiving the MCS value in radio resource control (RRC) messages or downlink control information (DCI).

In a second example of the present application, there is provided a user equipment (UE) including a processor and a computer-readable medium. The computer-readable medium has stored thereon, computer executable instructions, that when executed by the processor, perform the method as described above.

In a third example of the present application, there is provided a method for a network device for using configured grant in unlicensed spectrum. The method includes transmitting, by the network device to a user equipment (UE), configured grant (CG) resource configuration information to configure the UE for a plurality of CG uplink transmissions in a CG transmission resource. The CG transmission resource includes a plurality of transport block (TB) durations and each PUSCH duration includes a plurality of orthogonal frequency division multiplexed (OFDM) symbols. The CG resource configuration information includes an indication of a fixed size PUSCH duration within the CG transmission resource. The CG resource configuration information is used to configure multiple access occasions for the UE to start a CG uplink transmission within the CG transmission resource. When the CG transmission resource is a first CG transmission resource including a successful listen-before-talk (LBT) procedure by the UE at one of the multiple access occasions, the method includes the network device receiving a CG uplink transmission having a duration that is based upon the fixed size PUSCH duration and a number of the plurality of the OFDM symbols in the first CG transmission resource.

In some embodiments related to the third example, the method further includes configuring a plurality of PUSCH durations in the CG transmission resource based upon the fixed size PUSCH duration and the number of the plurality of the OFDM symbols in the first CG transmission resource.

In some embodiments related to the third example, configuring the plurality of PUSCH durations comprises at least one of: configuring at least one PUSCH duration that is equal to the fixed size PUSCH duration; configuring at least one PUSCH duration that is equal to the fixed size PUSCH duration and a PUSCH duration that is less than the fixed size PUSCH duration; and configuring at least one PUSCH duration that is equal to the fixed size PUSCH duration and a PUSCH duration that is greater than the fixed size PUSCH duration.

In some embodiments related to the third example, receiving a CG uplink transmission having a duration that is based upon the fixed size PUSCH duration and the number of the plurality of the OFDM symbols in the first CG transmission resource including a successful LBT procedure comprises at least one of: receiving at least one first CG uplink transmission, each first CG uplink transmission in a PUSCH duration equal to the fixed size PUSCH duration; receiving a second CG uplink transmission in a PUSCH duration that is less than the fixed size PUSCH duration; receiving a third CG uplink transmission in a PUSCH duration that is greater than the fixed size PUSCH duration; receiving at least one first CG uplink transmission in a PUSCH duration that is equal to the fixed size PUSCH duration and a second CG uplink transmission in a PUSCH duration that is less than the fixed size PUSCH duration; and receiving at least one first CG uplink transmission in a PUSCH duration that is equal to the fixed size PUSCH duration and a third CG uplink transmission in a PUSCH duration that is greater than the fixed size PUSCH duration.

In some embodiments related to the third example, the CG uplink transmission that is less than the fixed size PUSCH duration is located in a first PUSCH duration or a last PUSCH duration in the first CG transmission resource including a successful LBT procedure.

In some embodiments related to the third example, the CG uplink transmission that is greater than the fixed size PUSCH duration is located in a first PUSCH duration or a last PUSCH duration in the first CG transmission resource including a successful LBT procedure.

In some embodiments related to the third example, the method further includes the network device transmitting an indication that: a PUSCH duration that is greater than the fixed size PUSCH duration or a PUSCH duration that is less than the fixed size PUSCH duration is a first PUSCH duration in the first CG transmission resource; or a PUSCH duration that is greater than the fixed size PUSCH duration or a PUSCH duration that is less than the fixed size PUSCH duration is the last PUSCH duration in the first CG transmission resource.

In some embodiments related to the third example, the method further includes the network device transmitting an indication that: one of the PUSCH durations is greater than the fixed size PUSCH duration; or one of the PUSCH durations is less than the fixed size PUSCH duration.

In some embodiments related to the third example, the method further includes transmitting an indication of a starting OFDM symbol in the CG transmission resource, the indication indicating a starting OFDM symbol for a first CG uplink transmission in a first PUSCH duration.

In some embodiments related to the third example, if S is not equal to 0, applying the value of S to: only a first CG transmission resource of a plurality of configured CG transmission resources; or only a first CG transmission resource in which a LBT procedure has been successful to access the first CG transmission resource.

In some embodiments related to the third example, when configuring a plurality of PUSCH durations in the CG transmission resource, the starting OFDM symbol is one of: a first OFDM symbol in the CG transmission resource; an OFDM symbol in the CG transmission resource defined by mod ($N_{symbols}$, L), wherein $N_{symbols}$ is equal to the number of OFDM symbols in the first period and L is the number of OFDM symbols defined in the CG uplink transmission time domain resource duration; and the OFDM symbol in the CG transmission resource defined by m*L+mod ($N_{symbols}$, L), where m=0, 1, to n−1.

In some embodiments related to the third example, the method further includes, in a second and subsequent CG transmission resource, configuring a PUSCH duration in a same configuration as the first CG transmission resource.

In some embodiments related to the third example, the method further includes, in a second and subsequent CG transmission resource, when S is not equal to 0, configuring a PUSCH duration in a pre-defined configuration that is different than the configuration of the first CG transmission resource.

In some embodiments related to the third example, when receiving a plurality of CG uplink transmissions in respective PUSCH durations in the CG transmission resource, the starting OFDM symbol is one of: a first OFDM symbol in the CG transmission resource including a successful LBT procedure; an OFDM symbol in the CG transmission resource including a successful LBT procedure defined by mod ($N_{symbols}$, L), wherein $N_{symbols}$ is equal to the number of OFDM symbols in the first period and L is the number of OFDM symbols defined in the CG uplink transmission time domain resource duration; and the OFDM symbol in the CG transmission resource including a successful LBT procedure defined by m*L+mod ($N_{symbols}$, L), where m=0, 1, to n−1.

In some embodiments related to the third example, the method further includes, in a second and subsequent CG transmission resource after a successful CG uplink transmission in a first CG transmission resource, receiving CG uplink transmissions in a pre-defined configuration that is different than the configuration of the first CG transmission resource.

In some embodiments related to the third example, the pre-defined configuration that is different than the configuration of the first CG transmission resource comprises a single CG uplink transmission in a single PUSCH duration occupying an entire period.

In some embodiments related to the third example, the method further includes, in a second and subsequent CG transmission resource after a successful CG uplink transmission in a first CG transmission resource, receiving CG uplink transmissions in a same configuration as the configuration of the first CG transmission resource.

In some embodiments related to the third example, the fixed size TB block duration is defined in part by a TB block duration that is less than the duration of the fixed size TB block duration having to be greater than or equal to a minimum number of OFDM symbols.

In some embodiments related to the third example, the fixed size TB block duration is defined in part by the fixed size TB block having to be greater than or equal to a minimum number of OFDM symbols.

In some embodiments related to the third example, the method further includes transmitting a higher modulation and coding scheme (MCS) value for transmitting the CG uplink transmission that is less than the fixed size PUSCH duration.

In some embodiments related to the third example, the method further includes transmitting a lower MCS value for transmitting the CG uplink transmission that is greater than the fixed size duration.

In some embodiments related to the third example, the method further includes transmitting a single MCS value for transmitting CG uplink transmissions in a fixed size PUSCH duration, a PUSCH duration that is less than the fixed size PUSCH duration or a PUSCH duration that is greater than the fixed size PUSCH duration.

In some embodiments, the method further includes receiving the MCS value in radio resource control (RRC) messages or downlink control information (DCI).

In a fourth example of the present application, there is provided a network side device including a processor and a computer-readable medium. The computer-readable medium has stored thereon, computer executable instructions, that when executed by the processor, perform the method as described above.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
   receiving, by a user equipment (UE) from a network device, configured grant (CG) resource configuration information including time domain resource configuration information to configure a number of CG consecutive physical uplink shared channel (PUSCH) allocations within a slot of a CG time resource for the UE, the time domain resource configuration information comprising an indication of a start symbol and a fixed length of a first PUSCH allocation of the CG consecutive PUSCH allocations within the slot of the CG time resource, and
   wherein the time domain resource configuration information defines multiple access occasions within the slot for the UE to start a CG uplink transmission within the CG time resource, each access occasion starting at a starting symbol of a corresponding PUSCH of the CG consecutive PUSCH allocations;
   starting the CG uplink transmission in an unlicensed spectrum at a first access occasion of the multiple access occasions before which a listen-before-talk (LBT) channel access procedure is successful; and
   transmitting consecutive CG PUSCHs in remaining access occasions of the multiple access occasions in accordance with the CG consecutive PUSCH allocations.

2. The method of claim 1, wherein the UE is configured with a number of repetitions (K) greater than 1, and wherein the UE repeats a transmission block (TB) in K earliest consecutive transmission occasion candidates within a same configuration.

3. The method of claim 1, wherein for the CG consecutive PUSCH allocations within the slot, the first PUSCH allocation follows a configured Start and Length Indicator Value (SLIV) parameter, and remaining PUSCH allocations have a same length and a same PUSCH mapping type, and are appended following previous allocations without any gaps.

4. The method of claim 3, wherein a same combination of start symbol and length and PUSCH mapping type repeats over consecutively allocated slots.

5. The method of claim 1 further comprising:
   configuring the CG consecutive PUSCH allocations within the slot of the CG time resource based upon the fixed length of the first PUSCH allocation and a number of a plurality of orthogonal frequency division multiplexed (OFDM) symbols available for the CG uplink transmission in the slot of the CG time resource.

6. The method of claim 5, wherein the configuring the PUSCH allocations comprises at least one of:
   configuring at least one PUSCH allocation whose length that is equal to the fixed length of the first PUSCH allocation;
   configuring at least one PUSCH allocation whose length is equal to the fixed length of the first PUSCH allocation and a PUSCH allocation whose length is less than the fixed length of the first PUSCH allocation; or
   configuring at least one PUSCH allocation whose length is equal to the fixed length of the first PUSCH allocation and a PUSCH allocation whose length is greater than the fixed length of the first PUSCH allocation.

7. The method of claim 1, wherein the receiving the CG resource configuration information comprises receiving the CG resource configuration in:
   a radio resource control (RRC) message, or
   a combination of a RRC message and downlink control information (DCI).

8. The method of claim 1, wherein the slot is one of multiple slots in the CG time resource, wherein the time domain resource configuration information configures the number of the CG consecutive PUSCH allocations within each slot of the multiple slots, and wherein the CG consecutive PUSCH allocations include at least one CG PUSCH allocation whose length is different from 2 symbols and different from 7 symbols.

9. An apparatus comprising:
   at least one processor; and
   a non-transitory computer-readable medium, having stored thereon, computer executable instructions, that when executed by the at least one processor, cause the apparatus to:
   receive, from a network device, configured grant (CG) resource configuration information including time domain resource configuration information to configure a number of CG consecutive physical uplink shared channel (PUSCH) allocations within a slot of a CG time resource for the apparatus, the time domain resource configuration information comprising an indication of a start symbol and a fixed length of a first PUSCH allocation of the CG consecutive PUSCH allocations within the slot of the CG time resource, and wherein the time domain resource configuration information defines multiple access occasions within the slot for the apparatus to start a CG uplink transmission within the CG time resource, each access occasion starting at a starting symbol of a corresponding PUSCH of the CG consecutive PUSCH allocations;

start the CG uplink transmission in an unlicensed spectrum at a first access occasion of the multiple access occasions before which a listen-before-talk (LBT) channel access procedure is successful; and transmit consecutive CG PUSCHs in remaining access occasions of the multiple access occasions in accordance with the CG consecutive PUSCH allocations.

10. The apparatus of claim 9, wherein the apparatus is configured with a number of repetitions (K) greater than 1, and wherein the apparatus repeats a transmission block (TB) in K earliest consecutive transmission occasion candidates within a same configuration.

11. The apparatus of claim 9, wherein for the CG consecutive PUSCH allocations within the slot, the first PUSCH allocation follows a configured Start and Length Indicator Value (SLIV) parameter, and wherein remaining PUSCH allocations have a same length and a same PUSCH mapping type, and are appended following previous allocations without any gaps.

12. The apparatus of claim 11, wherein a same combination of start symbol and length and PUSCH mapping type repeats over consecutively allocated slots.

13. The apparatus of claim 9, the non-transitory computer-readable medium further including computer executable instructions to:

configure the CG consecutive PUSCH allocations in the CG time resource based upon the fixed length of the first PUSCH allocation and a number of a plurality of orthogonal frequency division multiplexed (OFDM) symbols available for the CG uplink transmission in the slot of the CG time resource.

14. The apparatus of claim 13, the computer executable instructions to configured the CG consecutive PUSCH allocations including at least one of:

configuring at least one PUSCH allocation whose length is equal to the fixed length of the first PUSCH allocation;

configuring at least one PUSCH allocation whose length is equal to the fixed length of the first PUSCH allocation and a PUSCH allocation whose length is less than the fixed length of the first PUSCH allocation; or configuring at least one PUSCH allocation whose length is equal to the fixed length of the first PUSCH allocation and a PUSCH allocation whose length that is greater than the fixed length of the first PUSCH allocation.

15. The apparatus of claim 9, wherein the computer executable instructions to receive the CG resource configuration information include computer executable instructions to receive the CG resource configuration in:

a radio resource control (RRC) message, or
a combination of a RRC message and downlink control information (DCI).

16. A method comprising:

transmitting, by a network device to a user equipment (UE), configured grant (CG) resource configuration information including time domain resource configuration information to configure a number of CG consecutive physical uplink shared channel (PUSCH) allocations within a slot of a CG time resource for the UE, the time domain resource configuration information comprising an indication of a start symbol and a fixed length of a first PUSCH allocation of the CG consecutive PUSCH allocations within the slot of the CG time resource, and wherein the time domain resource configuration information defines multiple access occasions within the slot for the UE to start a CG uplink transmission within the CG time resource, each access occasion starting at a starting symbol of a corresponding PUSCH of the CG consecutive PUSCH allocations;

receiving the CG uplink transmission in an unlicensed spectrum at a first access occasion of the multiple access occasions before which a listen-before-talk (LBT) channel access procedure is successful; and receiving consecutive CG PUSCHs in remaining access occasions of the multiple access occasions in accordance with the CG consecutive PUSCH allocations.

17. The method of claim 16, wherein the CG resource configuration information comprises a number of repetitions (K) greater than 1 and causing the UE to repeat a transmission block (TB) in K earliest consecutive transmission occasion candidates within a same configuration.

18. The method of claim 16, wherein for the CG consecutive PUSCH allocations within the slot, the first PUSCH allocation follows a configured Start and Length Indicator Value (SLIV) parameter, and wherein remaining PUSCH allocations have a same length and a same PUSCH mapping type, and are appended following previous allocations without any gaps.

19. The method of claim 18, wherein a same combination of start symbol and length and PUSCH mapping type repeats over consecutively allocated slots.

20. The method of claim 16, wherein the CG resource configuration information comprises information to configure the CG consecutive PUSCH allocations in the CG time resource based upon the fixed length of the first PUSCH allocation and a number of a plurality of orthogonal frequency division multiplexed modulation (OFDM) symbols available for the CG uplink transmission in the slot of the CG time resource.

21. The method of claim 20, wherein the CG resource configuration information comprises information to configure the CG consecutive PUSCH allocations by:

configuring at least one PUSCH allocation whose length is equal to the fixed length of the first PUSCH allocation;

configuring at least one PUSCH allocation whose length is equal to the fixed length of the first PUSCH allocation and a PUSCH allocation whose length is less than the fixed length of the first PUSCH allocation; or configuring at least one PUSCH allocation whose length is equal to the fixed length of the first PUSCH allocation and a PUSCH allocation whose length is greater than the fixed length of the first PUSCH allocation.

22. The method of claim 16, wherein the transmitting the CG resource configuration information comprises transmitting the CG resource configuration in:
- a radio resource control (RRC) message, or
- a combination of a RRC message and downlink control information (DCI).

23. A network device comprising:
- at least one processor; and
- a non-transitory computer-readable medium, having stored thereon, computer executable instructions, that when executed by the at least one processor, cause the network device to:
- transmit, to a user equipment (UE), configured grant (CG) resource configuration information including time domain resource configuration information to configure a number of CG consecutive physical uplink shared channel (PUSCH) allocations within a slot of a CG time resource, the time domain resource configuration information comprising an indication of a start symbol and a fixed length of a first PUSCH allocation of the CG consecutive PUSCH allocations within the slot of the CG time resource, and
- wherein the time domain resource configuration information defines multiple access occasions within the slot for the UE to start a CG uplink transmission within the CG time resource, each access occasion starting at a starting symbol of a corresponding PUSCH of the CG consecutive PUSCH allocations;
- receive the CG uplink transmission in an unlicensed spectrum at a first access occasion of the multiple access occasions before which a listen-before-talk (LBT) channel access procedure is successful; and
- receive consecutive CG PUSCHs in remaining access occasions of the multiple access occasions in accordance with the CG consecutive PUSCH allocations.

24. The network device of claim 23, wherein the CG resource configuration information comprises a number of repetitions K) is greater than 1 and causing the UE to repeat a transmission block (TB) in K earliest consecutive transmission occasion candidates within a same configuration.

25. The network device of claim 23, wherein for the CG consecutive PUSCH allocations within the slot, the first PUSCH allocation follows a configured Start and Length Indicator Value (SLIV) parameter, and wherein remaining PUSCH allocations have a same length and a same PUSCH mapping type, and are appended following previous allocations without any gaps.

26. The network device of claim 23, wherein a same combination of start symbol and length and PUSCH mapping type repeats over consecutively allocated slots.

27. The network device of claim 23, wherein the CG resource configuration information comprises information to configure the CG consecutive PUSCH allocations in the CG time resource based upon the fixed length of the first PUSCH allocation and a number of a plurality of orthogonal frequency division multiplexed (OFDM) symbols available for the CG uplink transmission in a first the slot of the CG time resource.

28. The network device of claim 27, wherein the CG resource configuration information comprises information to configure the CG consecutive PUSCH allocations by:
- configuring at least one PUSCH allocation whose length is equal to the fixed length of the first PUSCH allocation;
- configuring at least one PUSCH allocation whose length is equal to the fixed length of the first PUSCH allocation and a PUSCH allocation whose length is less than the fixed length of the first PUSCH allocation; and
- configuring at least one PUSCH allocation whose length is equal to the fixed length of the first PUSCH allocation and a PUSCH allocation whose length is greater than the fixed length of the first PUSCH allocation.

29. The network device of claim 23, wherein the computer executable instructions to transmit the CG resource configuration information include computer executable instructions to transmit the CG resource configuration in:
- a radio resource control (RRC) message, or
- a combination of a RRC message and downlink control information (DCI).

* * * * *

UNITED STATES PATENT AND TRADEMARK OFFICE
CERTIFICATE OF CORRECTION

PATENT NO. : 11,490,382 B2
APPLICATION NO. : 16/905497
DATED : November 1, 2022
INVENTOR(S) : Mohamed Adel Salem It is certified that error appears in the above-identified patent and that said Letters Patent is hereby corrected as shown below:

In the Claims

Claim 1, Column 41, Line 63; delete "and".

Claim 6, Column 42, Lines 34-35; delete "that" between "length" and "is".

Claim 14, Column 43, Line 58; delete "that" between "length" and "is".

Claim 24, Column 45, Line 38; delete "K) is greater" and insert --(K) greater--.

Claim 27, Column 46, Line 17; delete "a first".

Signed and Sealed this
Tenth Day of January, 2023

*Katherine Kelly Vidal*

Katherine Kelly Vidal
*Director of the United States Patent and Trademark Office*